United States Patent
Seo et al.

(10) Patent No.: US 11,438,117 B2
(45) Date of Patent: Sep. 6, 2022

(54) METHOD FOR RECEIVING REFERENCE SIGNAL BY TERMINAL IN WIRELESS COMMUNICATION SYSTEM, AND TERMINAL USING SAME METHOD

(71) Applicant: LG ELECTRONICS INC., Seoul (KR)

(72) Inventors: Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 103 days.

(21) Appl. No.: 17/041,130

(22) PCT Filed: Apr. 3, 2019

(86) PCT No.: PCT/KR2019/003956
§ 371 (c)(1),
(2) Date: Sep. 24, 2020

(87) PCT Pub. No.: WO2019/194580
PCT Pub. Date: Oct. 10, 2019

(65) Prior Publication Data
US 2021/0119747 A1    Apr. 22, 2021

Related U.S. Application Data

(60) Provisional application No. 62/652,856, filed on Apr. 4, 2018, provisional application No. 62/659,122, filed on Apr. 17, 2018.

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC . H04L 27/14; H04L 5/00; H04L 25/02; H04L 5/0007; H04L 5/0048; H04L 25/03;
(Continued)

(56) References Cited

U.S. PATENT DOCUMENTS 10,547,413 B2 *  1/2020  Seo ...................... H04B 7/0482
10,716,105 B2 *  7/2020  Hwang .................... H04L 5/00
(Continued)

OTHER PUBLICATIONS

PCT International Application No. PCT/KR2019/003956, International Search Report dated May 28, 2019, 2 pages.
(Continued)

*Primary Examiner* — Man U Phan
(74) *Attorney, Agent, or Firm* — Lee Hong Degerman Kang & Waimey

(57) ABSTRACT

Proposed is a method for receiving a reference signal by a terminal in a wireless communication system. The method comprises: receiving a control resource set (CORESET) and information on a reference signal mapped to a resource included in the CORESET; and receiving the reference signal on the basis of the information, wherein, when the CORESET overlaps a synchronization signal/physical broadcast channel block (SSB), the reference signal is mapped to a remaining resource region except for an overlapping resource region in which the CORESET overlaps the SSB in the CORESET.

14 Claims, 22 Drawing Sheets

(58) Field of Classification Search
CPC ..... H04L 5/0094; H04L 5/001; H04L 5/0053; H04L 25/0202; H04L 5/0051; H04L 25/0224; H04W 72/04; H04W 80/02; H04W 76/27
USPC .......................................................... 370/329
See application file for complete search history.

(56) References Cited

U.S. PATENT DOCUMENTS

| | | | | |
|---|---|---|---|---|
| 11,018,910 | B2* | 5/2021 | Liao | H04W 76/27 |
| 11,044,619 | B2* | 6/2021 | Seo | H04W 72/046 |
| 11,044,622 | B2* | 6/2021 | Seo | H04W 24/08 |
| 11,166,249 | B2* | 11/2021 | Lin | H04W 72/0446 |
| 2018/0042028 | A1 | 2/2018 | Nam et al. | |
| 2018/0227777 | A1* | 8/2018 | Sun | H04W 24/08 |
| 2020/0229008 | A1* | 7/2020 | Islam | H04L 5/0051 |
| 2020/0267697 | A1* | 8/2020 | Liu | H04L 5/0044 |
| 2020/0314777 | A1* | 10/2020 | Liu | H04W 72/04 |
| 2020/0366398 | A1* | 11/2020 | Takeda | H04W 72/042 |
| 2021/0022186 | A1* | 1/2021 | Liu | H04W 74/0833 |
| 2021/0410086 | A1* | 12/2021 | Davydov | H04L 27/26 |

OTHER PUBLICATIONS

Spreadtrum Communications, "Remaining issues on PDCCH structure," 3GPP TSG RAN WG1 Meeting AH 1801, R1-1800285, Vancouver, Canada, Jan. 22-26, 2018, 7 pages.

Vivo, "Discussion on Remaining Minimum System Information," 3GPP TSG RAN WG1 Meeting#92, R1-1801508, Greece, Athens, Feb. 26-Mar. 2, 2018, 10 pages.

Spreadtrum Communications, "Remaining issues on PDCCH structure," 3GPP TSG RAN WG1 Meeting#92, R1-1801837, Greece, Athens, Feb. 26-Mar. 2, 2018, 9 pages.

Catt, "Summary of Offline Discussion on RMSI," 3GPP TSG RAN WG1 Meeting#92, R1-1803315, Greece, Athens, Feb. 26-Mar. 2, 2018, 19 pages.

* cited by examiner

METHOD FOR RECEIVING REFERENCE SIGNAL BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2019/003956, filed on Apr. 3, 2019, which claims the benefit of U.S. Provisional Application No. 62/652,856, filed on Apr. 4, 2018, and 62/659,122, filed on Apr. 17, 2018, the contents of which are all hereby incorporated by reference herein in their entirety.

FIELD OF THE DESCRIPTION

The present description relates to wireless communication, and more particularly, to a method of receiving a reference signal of a user equipment (UE) in a wireless communication system, and the UE using the method.

RELATED ART

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present description for convenience.

In a physical downlink control channel (PDCCH) reception procedure, a user equipment (UE) can perform channel estimation by using a reference signal related to a corresponding PDCCH decoding candidate, and a channel estimation method based on a wideband reference signal can more simplify the channel estimation operation of the UE. Herein, there may be a case where a control resource set (CORESET) in which a wideband reference signal is mapped overlaps with a synchronization signal block (SSB). In this case, a method of receiving a reference signal for a channel estimation operation may be problematic in regards to a corresponding overlapping CORESET part.

SUMMARY

The present description provides a method of receiving a reference signal of a user equipment (UE) in a wireless communication system, and the UE using the method.

In one aspect, a method for receiving a reference signal of a user equipment (UE) in a wireless communication system is provided. The method comprises receiving information on a reference signal to be mapped to a control resource set (CORESET) and a resource comprised in the CORESET; and receiving the reference signal, based on the information, wherein, based on the CORESET overlapping with a synchronization signal/physical broadcast channel block (SSB), the reference signal is mapped to a remaining resource region in the CORESET excluding an overlap resource region overlapping with the SSB.

Herein, the reference signal may be mapped to a second resource region in the CORESET, excluding the overlap resource region and a first resource region having the same frequency band as the overlap resource region.

Herein, the same precoding may be applied in the second resource region.

Herein, the reference signal may be mapped only to a third resource region comprising a physical downlink control channel (PDCCH) decoding candidate in the second resource region.

Herein, the third resource region may have a same time domain as the CORESET, and is configured in unit of contiguous resources in a frequency domain.

Herein, a same precoding may be applied in the third resource region.

Herein, different precoding may be applied in the third resource region in unit of contiguous resources in the frequency domain.

Herein, a same precoding may be applied in the remaining resource region.

Herein, the reference signal may not be mapped to a fourth resource region having a same time domain as the overlap resource region in the remaining resource region, and the fourth resource region may be configured in unit of contiguous resources in a frequency domain.

Herein, the reference signal may be mapped to contiguous resources comprising a PDCCH decoding candidate in the fourth resource region.

Herein, the same precoding may be applied to resources to which the reference signal is mapped.

Herein, the UE may receive the information, based on higher layer signaling.

Herein, the reference signal may be a demodulation reference signal (DMRS).

Herein, based on the CORESET overlapping with a reserved resource, the reference signal may not be mapped to a resource overlapping with the reserved resource in the CORESET.

In another aspect, provided is a user equipment (UE) comprising: a transceiver transmitting and receiving a radio signal; and a processor operatively coupled with the transceiver, wherein the processor is configured to: receive information on a reference signal to be mapped to a control resource set (CORESET) and a resource comprised in the CORESET; and receive the reference signal, based on the information, wherein, based on the CORESET overlapping with a synchronization signal/physical broadcast channel block (SSB), the reference signal is mapped to a remaining resource region in the CORESET excluding an overlap resource region overlapping with the SSB.

According to the present description, a method of receiving a reference signal of a UE is proposed in a next-generation communication system for a CORESET in which a wideband reference signal is mapped in a situation where an SSB overlaps with the COREST. Further, the UE can more effectively perform a channel estimation operation by using the method.

DESCRIPTION OF EXEMPLARY EMBODIMENTS

Figure 1:
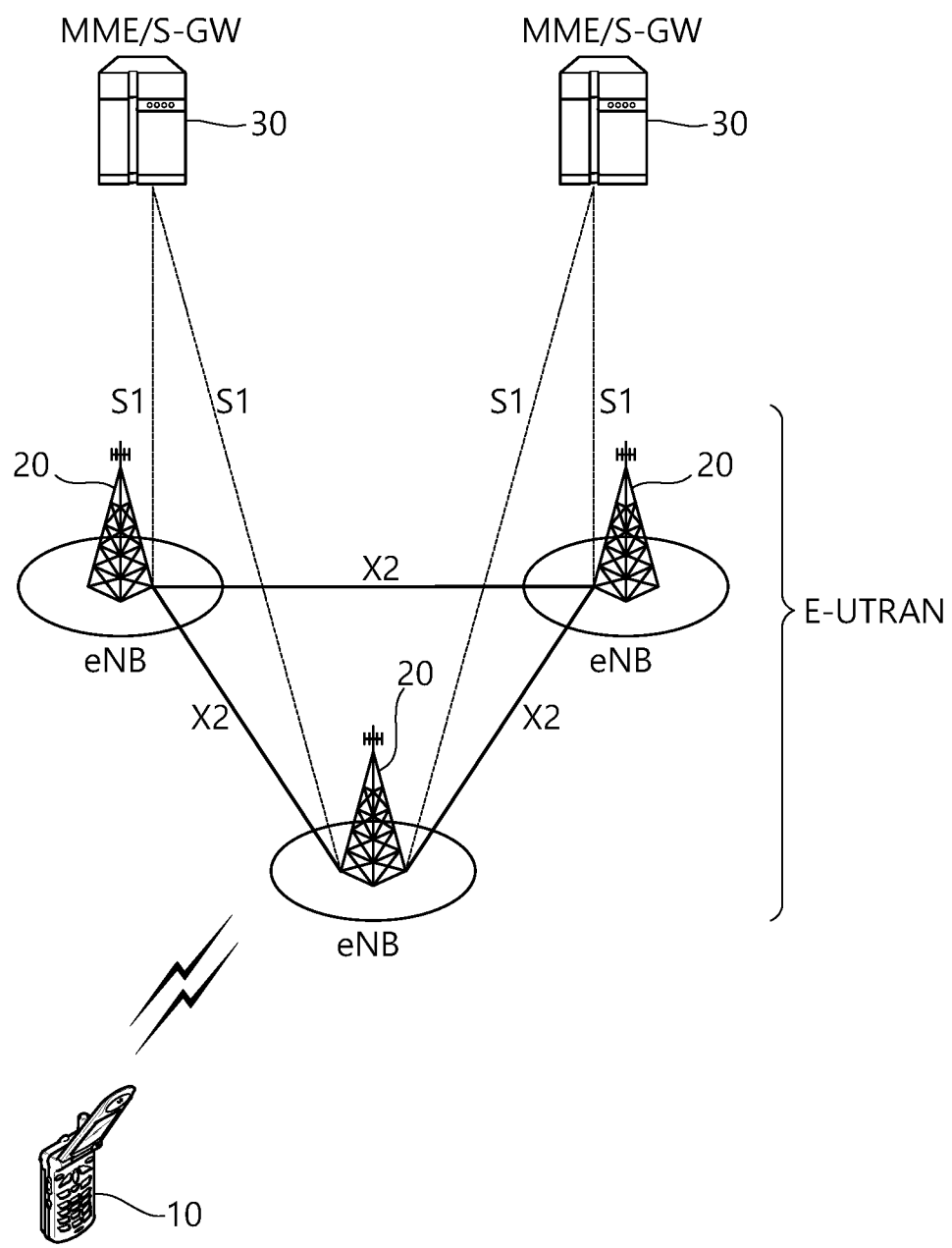
FIG. 1 shows a wireless communication system to which the present description may be applied.

FIG. 1 shows a wireless communication system to which the present description may be applied. The wireless communication system may be referred to as an Evolved-UMTS Terrestrial Radio Access Network (E-UTRAN) or a Long Term Evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
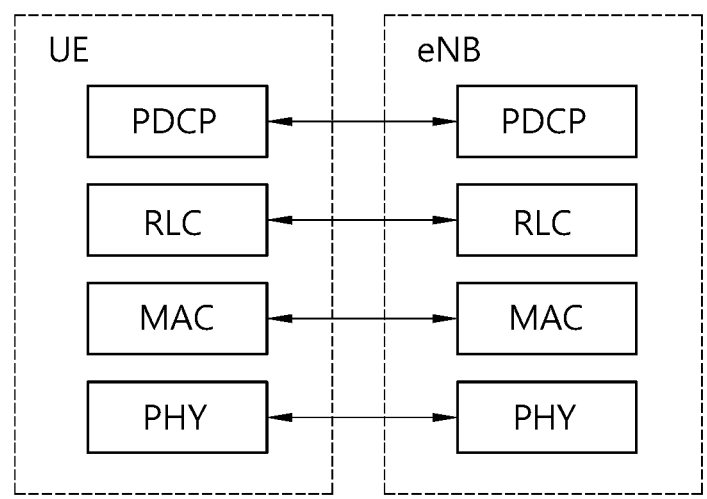
FIG. 2 is a diagram showing a wireless protocol architecture for a user plane.
Figure 3:
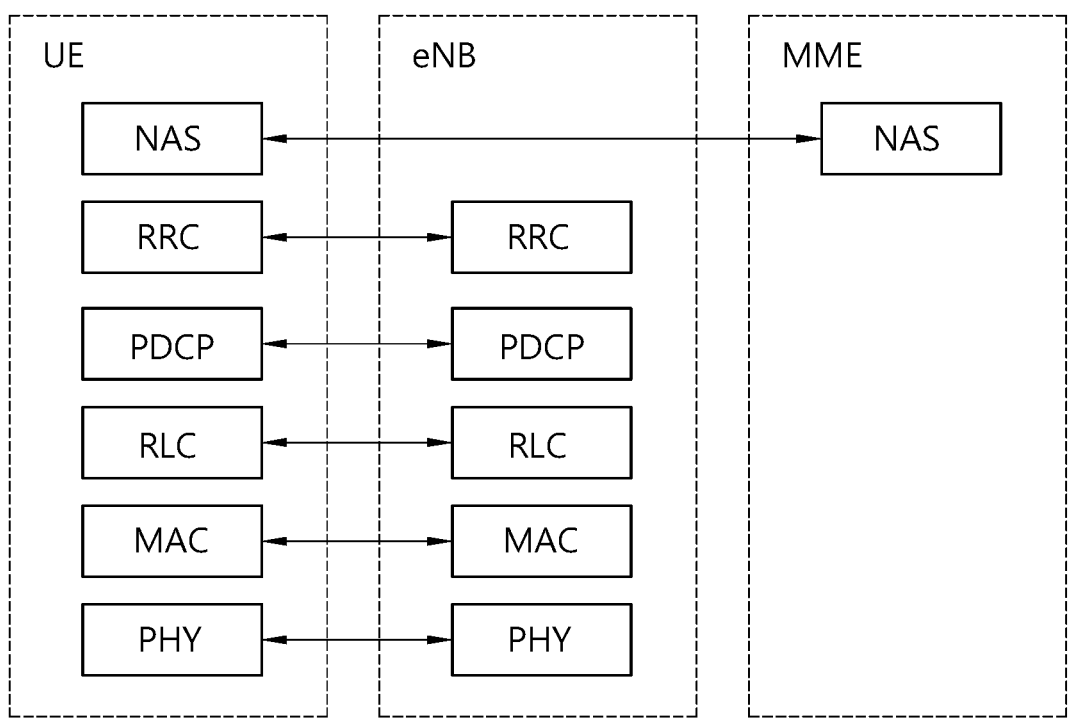
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication (eMBB), massive MTC (mMTC), ultrareliable and low latency communication (URLLC) is discussed. This new technology may be called new radio access technology (new RAT or NR) in the present description for convenience.

Figure 4:
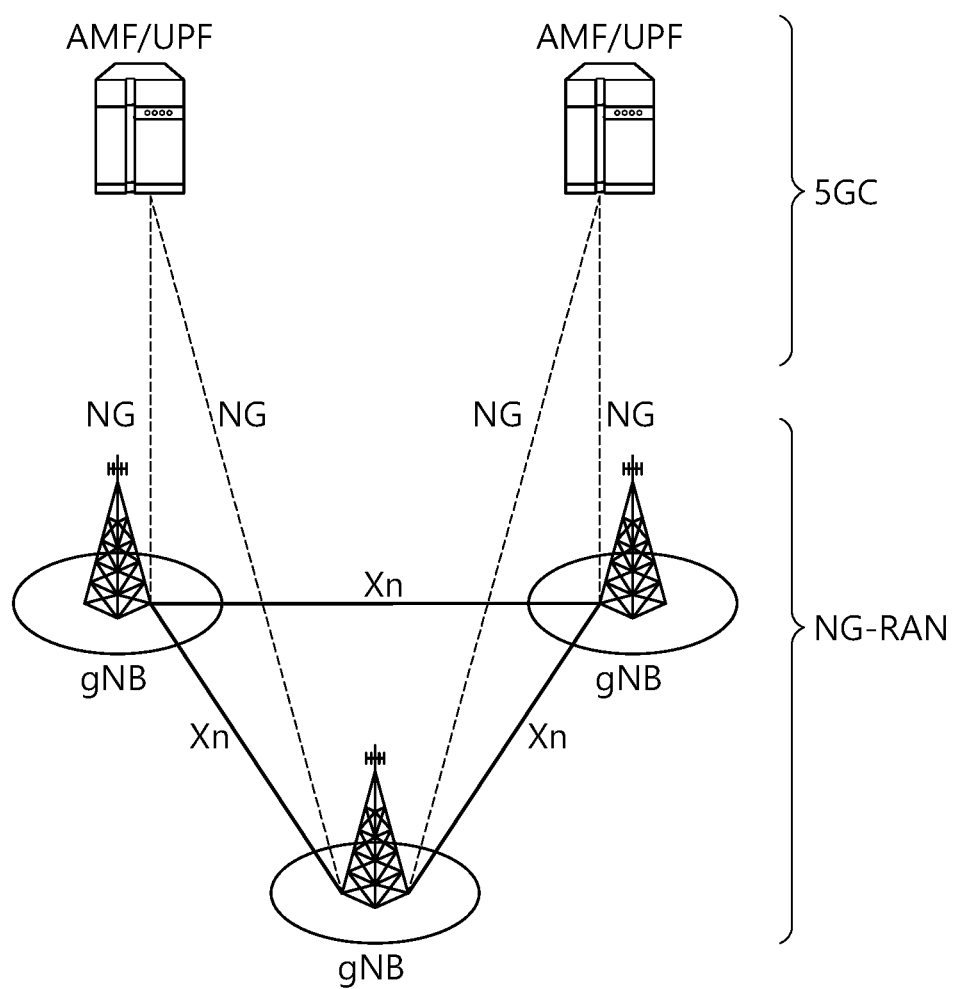
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
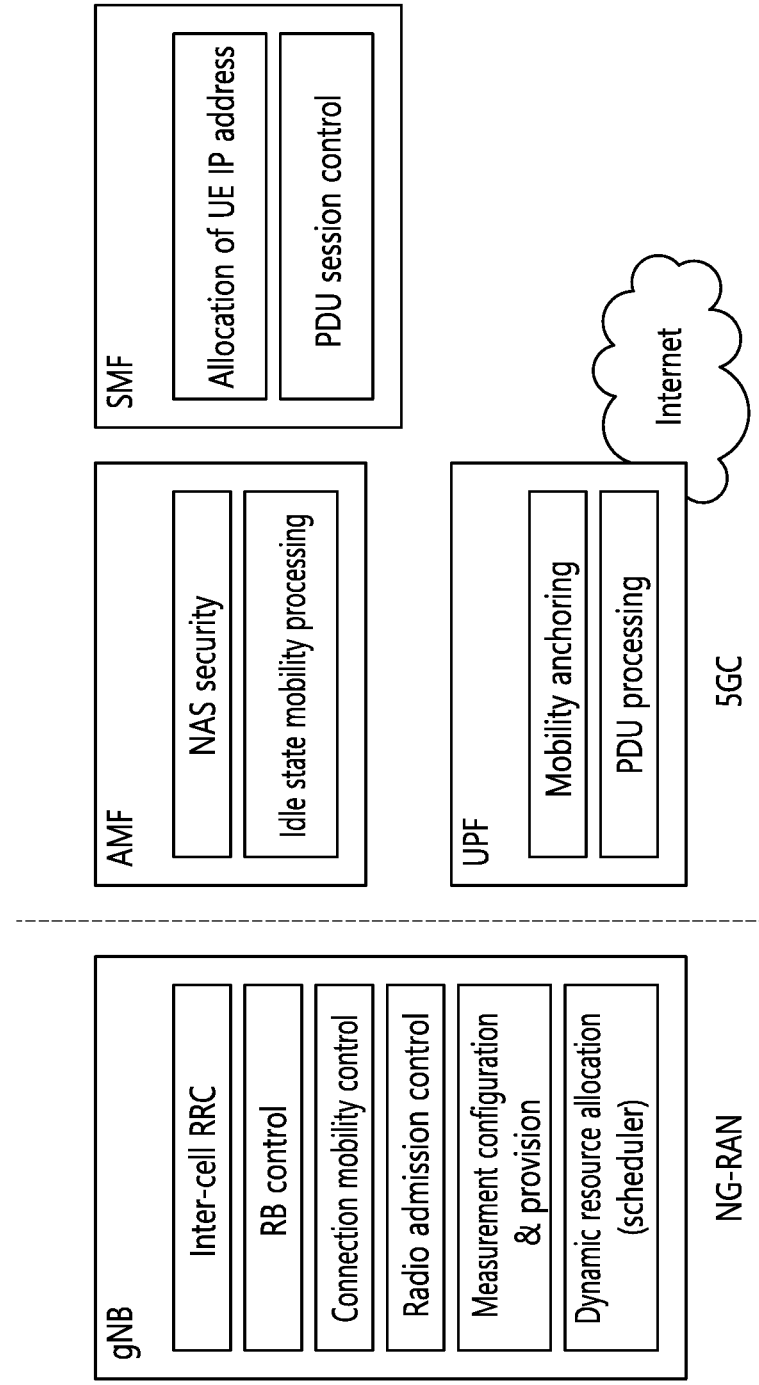
FIG. 5 illustrates a functional division between an NG-RAN and a 5GC.

FIG. 5 illustrates a functional division between an NG-RAN and a 5GC.

The gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. The SMF may provide functions such as UE IP address assignment, PDU session control, and so on.

Figure 6:
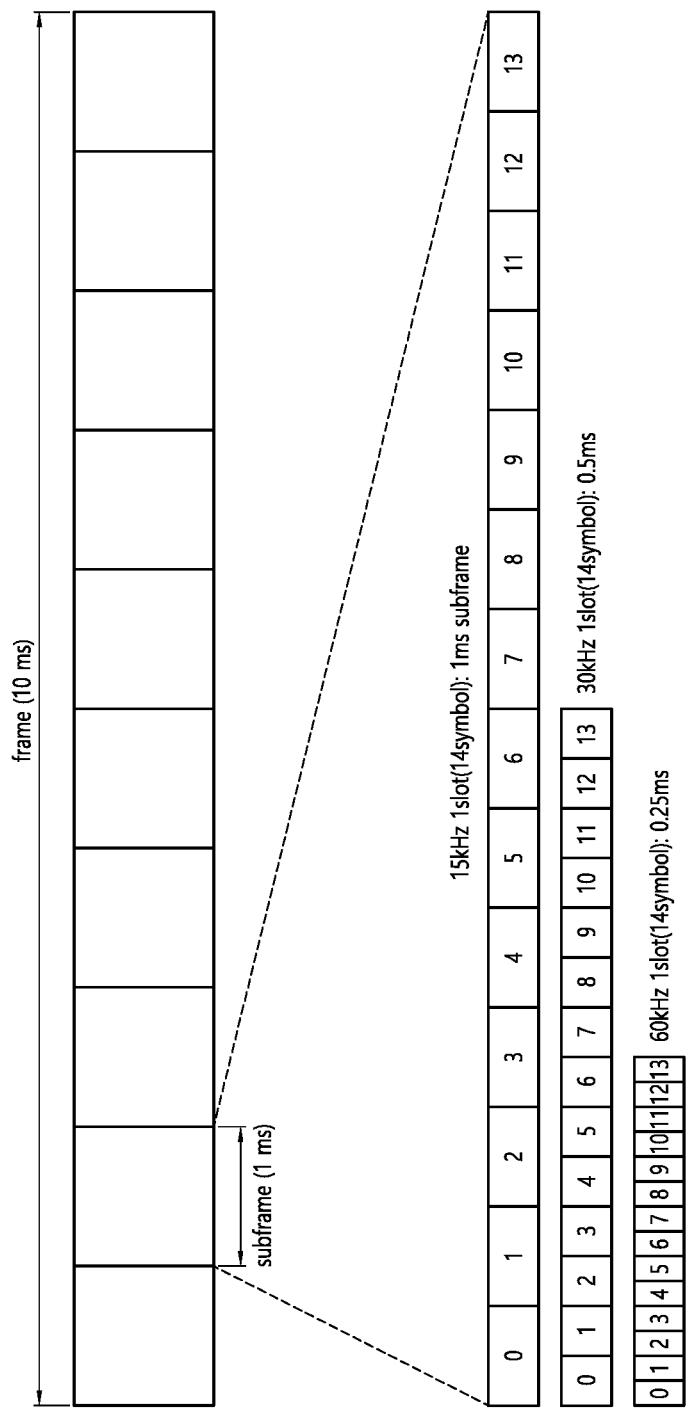
FIG. 6 illustrates an example of a frame structure that may be applied in NR.

FIG. 6 illustrates an example of a frame structure that may be applied in NR.

Referring to FIG. 6, a frame may be composed of 10 milliseconds (ms) and include 10 subframes each composed of 1 ms.

One or a plurality of slots may be included in a subframe according to subcarrier spacings.

The following table 1 illustrates a subcarrier spacing configuration

TABLE 1

| $\mu$ | $\Delta f = 2^{\mu} \cdot 15[kHz]$ | Cyclic prefix |
|---|---|---|
| 0 | 15 | Normal |
| 1 | 30 | Normal |
| 2 | 60 | Normal |
|   |    | Extended |
| 3 | 120 | Normal |
| 4 | 240 | Normal |

The following table 2 illustrates the number of slots in a frame ($N^{frame,\mu}_{slot}$), the number of slots in a subframe ($N^{subframe,\mu}_{slot}$), the number of symbols in a slot ($N^{slot}_{symb}$), and the like, according to subcarrier spacing configurations $\mu$.

TABLE 2

| $\mu$ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

In FIG. 6, $\mu$=0, 1, 2 is illustrated.

A physical downlink control channel (PDCCH) may include one or more control channel elements (CCEs) as illustrated in the following table 3.

TABLE 3

| Aggregation level | Number of CCEs |
|---|---|
| 1 | 1 |
| 2 | 2 |
| 4 | 4 |
| 8 | 8 |
| 16 | 16 |

That is, the PDCCH may be transmitted through a resource including 1, 2, 4, 8, or 16 CCEs. Here, the CCE includes six resource element groups (REGs), and one REG includes one resource block in a frequency domain and one orthogonal frequency division multiplexing (OFDM) symbol in a time domain.

Meanwhile, in a future wireless communication system, a new unit called a control resource set (CORESET) may be introduced. The terminal may receive the PDCCH in the CORESET.

Figure 7:
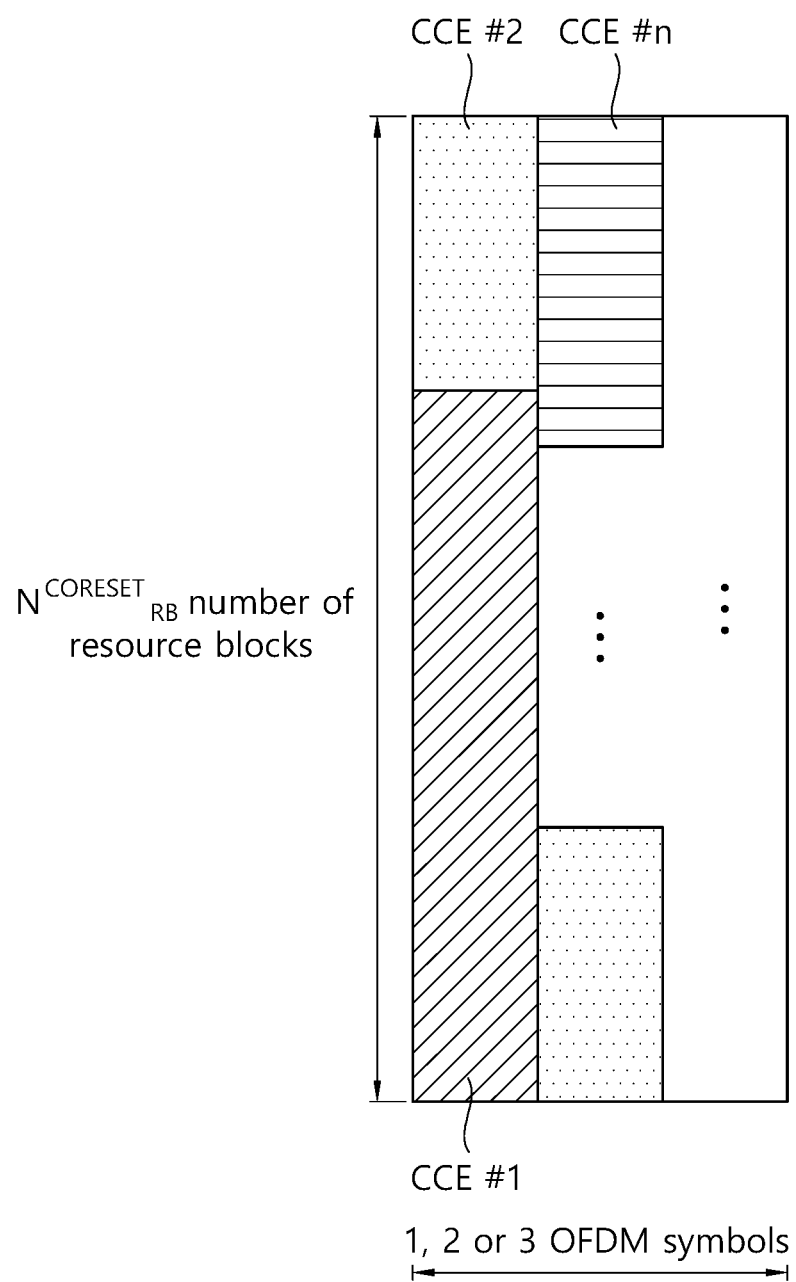
FIG. 7 illustrates CORESET.

FIG. 7 illustrates CORESET.

Referring to FIG. 7, the CORESET includes $N^{CORESET}_{RB}$ number of resource blocks in the frequency domain, and $N^{CORESET}_{symb} \in \{1, 2, 3\}$ number of symbols in the time domain. $N^{CORESET}_{RB}$ and $N^{CORESET}_{symb}$ may be provided by a base station via higher layer signaling. As illustrated in FIG. 7, a plurality of CCEs (or REGs) may be included in the CORESET.

The UE may attempt to detect a PDCCH in units of 1, 2, 4, 8, or 16 CCEs in the CORESET. One or a plurality of CCEs in which PDCCH detection may be attempted may be referred to as PDCCH candidates.

A plurality of CORESETs may be configured for the terminal/UE.

Figure 8:
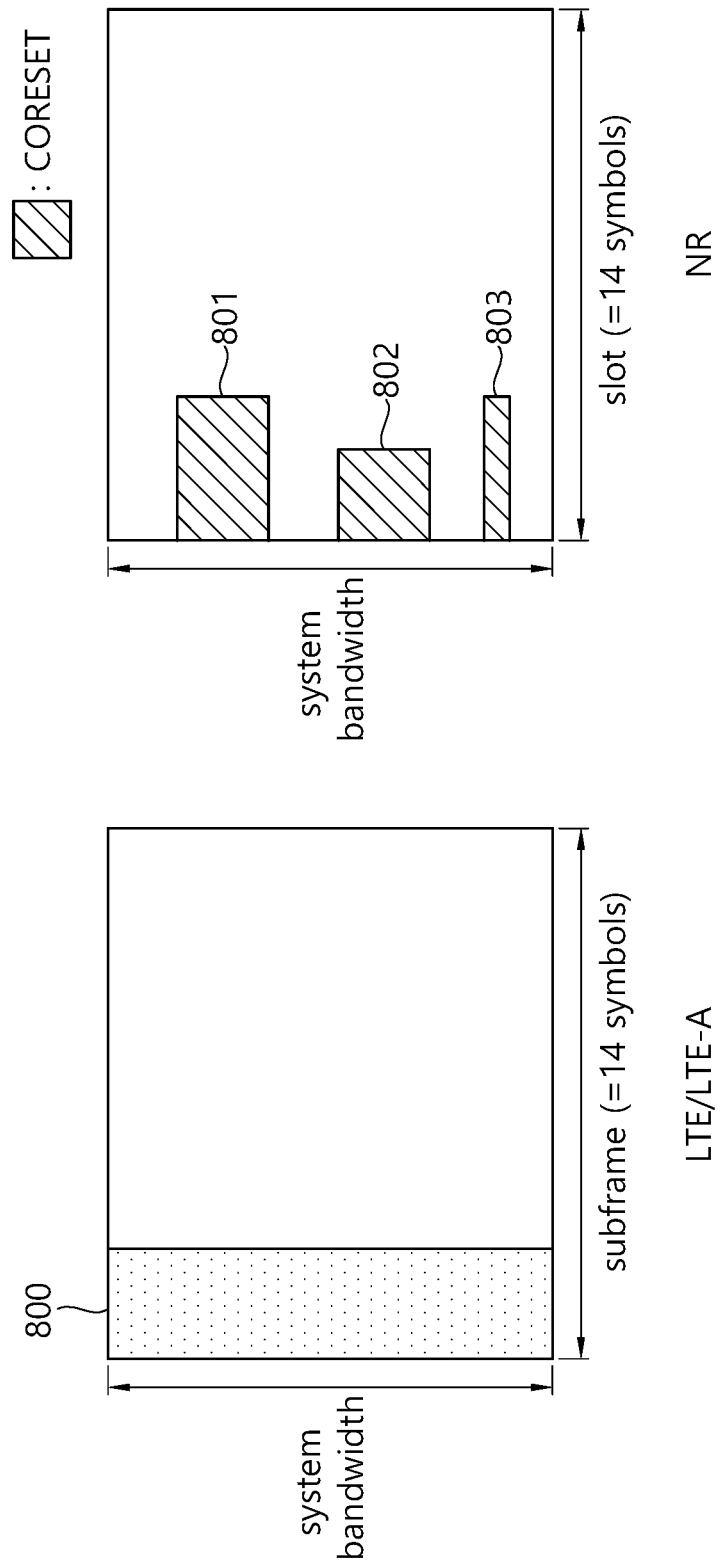
FIG. 8 is a diagram illustrating a difference between a related art control region and the CORESET in NR.

FIG. 8 is a diagram illustrating a difference between a related art control region and the CORESET in NR.

Referring to FIG. 8, a control region 800 in the related art wireless communication system (e.g., LTE/LTE-A) is configured over the entire system band used by a base station (BS). All the terminals, excluding some (e.g., eMTC/NB-IoT terminal) supporting only a narrow band, must be able to receive wireless signals of the entire system band of the BS in order to properly receive/decode control information transmitted by the BS.

On the other hand, in NR, CORESET described above was introduced. CORESETs 801, 802, and 803 are radio resources for control information to be received by the terminal and may use only a portion, rather than the entirety of the system bandwidth. The BS may allocate the CORESET to each UE and may transmit control information through the allocated CORESET. For example, in FIG. 8, a first CORESET 801 may be allocated to UE 1, a second CORESET 802 may be allocated to UE 2, and a third CORESET 803 may be allocated to UE 3. In the NR, the terminal may receive control information from the BS, without necessarily receiving the entire system band.

The CORESET may include a UE-specific CORESET for transmitting UE-specific control information and a common CORESET for transmitting control information common to all UEs.

Meanwhile, NR may require high reliability according to applications. In such a situation, a target block error rate (BLER) for downlink control information (DCI) transmitted through a downlink control channel (e.g., physical downlink control channel (PDCCH)) may remarkably decrease compared to those of conventional technologies. As an example of a method for satisfying requirement that requires high reliability, content included in DCI can be reduced and/or the amount of resources used for DCI transmission can be increased. Here, resources can include at least one of resources in the time domain, resources in the frequency domain, resources in the code domain and resources in the spatial domain.

In NR, the following technologies/features can be applied.

<Self-Contained Subframe Structure>

Figure 9:
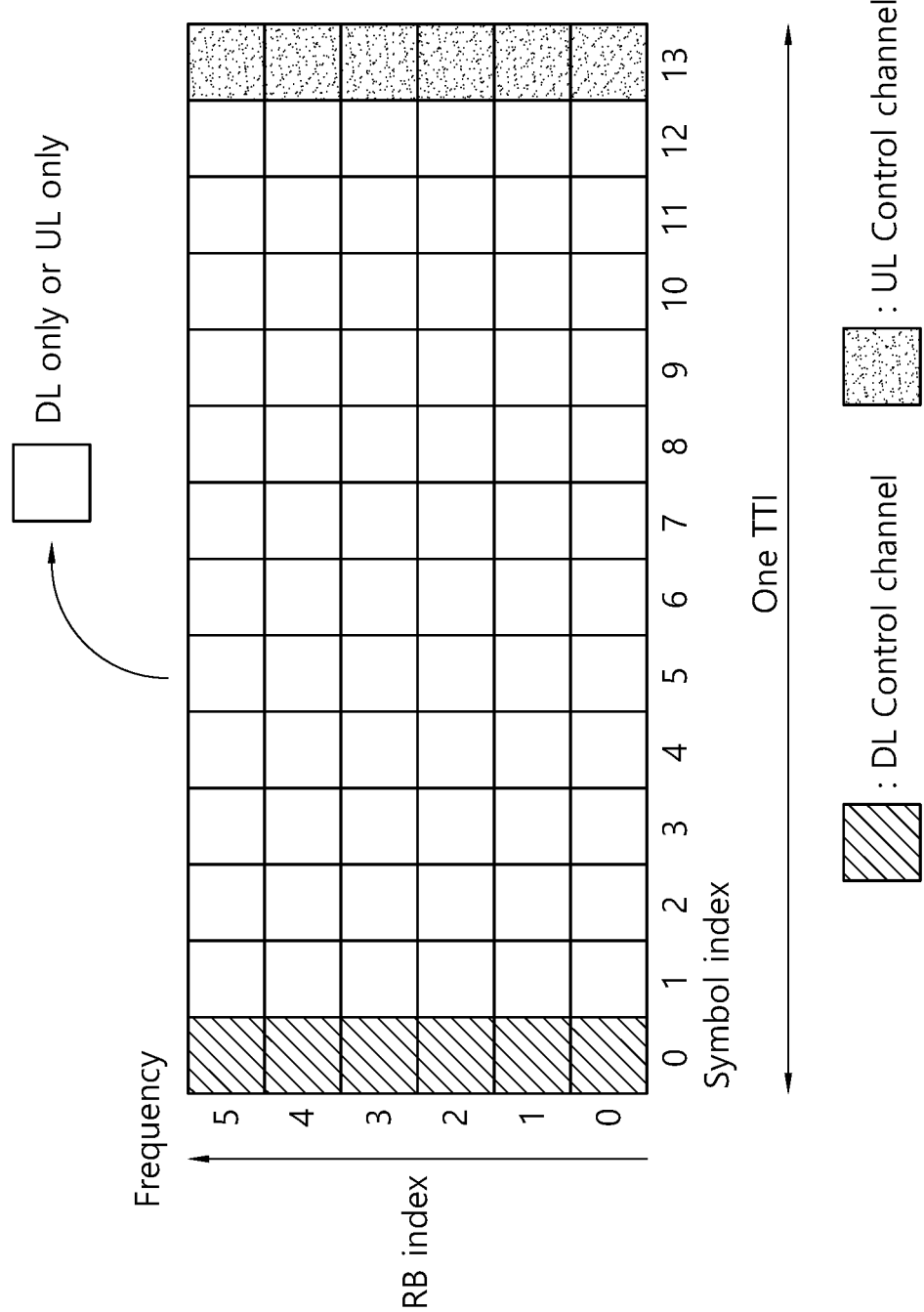
FIG. 9 illustrates an example of a frame structure for new radio access technology.

FIG. 9 illustrates an example of a frame structure for new radio access technology.

In NR, a structure in which a control channel and a data channel are time-division-multiplexed within one TTI, as shown in FIG. 9, can be considered as a frame structure in order to minimize latency.

In FIG. 9, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this data and control TDMed subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 100 antenna elements can be installed in the form of a 2-dimensional array at an interval of 0.5 lambda (wavelength) in a panel of 5×5 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

<Analog Beamforming #2>

When a plurality of antennas is used in NR, hybrid beamforming which is a combination of digital beamforming and analog beamforming is emerging. Here, in analog beamforming (or RF beamforming) an RF end performs precoding (or combining) and thus it is possible to achieve the performance similar to digital beamforming while reducing the number of RF chains and the number of D/A (or A/D)

converters. For convenience, the hybrid beamforming structure may be represented by N TXRUs and M physical antennas. Then, the digital beamforming for the L data layers to be transmitted at the transmitting end may be represented by an N by L matrix, and the converted N digital signals are converted into analog signals via TXRUs, and analog beamforming represented by an M by N matrix is applied.

Figure 10:
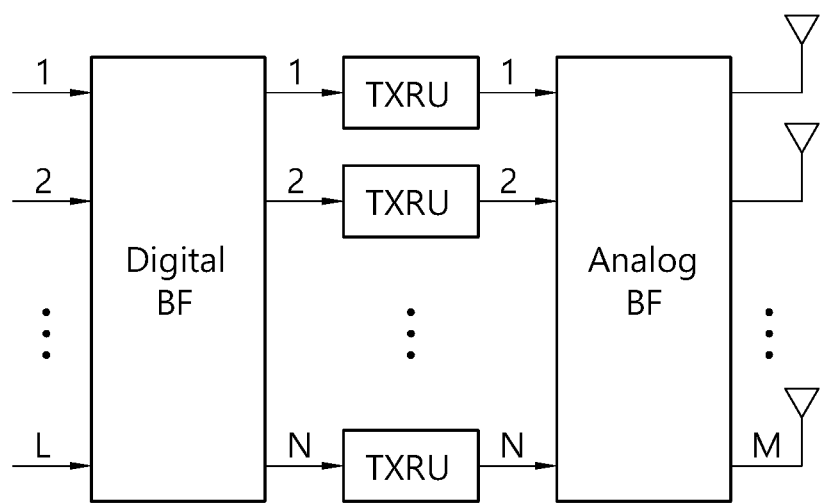
FIG. 10 is an abstract schematic diagram illustrating hybrid beamforming from the viewpoint of TXRUs and physical antennas.

FIG. 10 is an abstract schematic diagram illustrating hybrid beamforming from the viewpoint of TXRUs and physical antennas.

In FIG. 10, the number of digital beams is L and the number of analog beams is N. Further, in the NR system, by designing the base station to change the analog beamforming in units of symbols, it is considered to support more efficient beamforming for a terminal located in a specific area. Furthermore, when defining N TXRUs and M RF antennas as one antenna panel in FIG. 10, it is considered to introduce a plurality of antenna panels to which independent hybrid beamforming is applicable in the NR system.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 11:
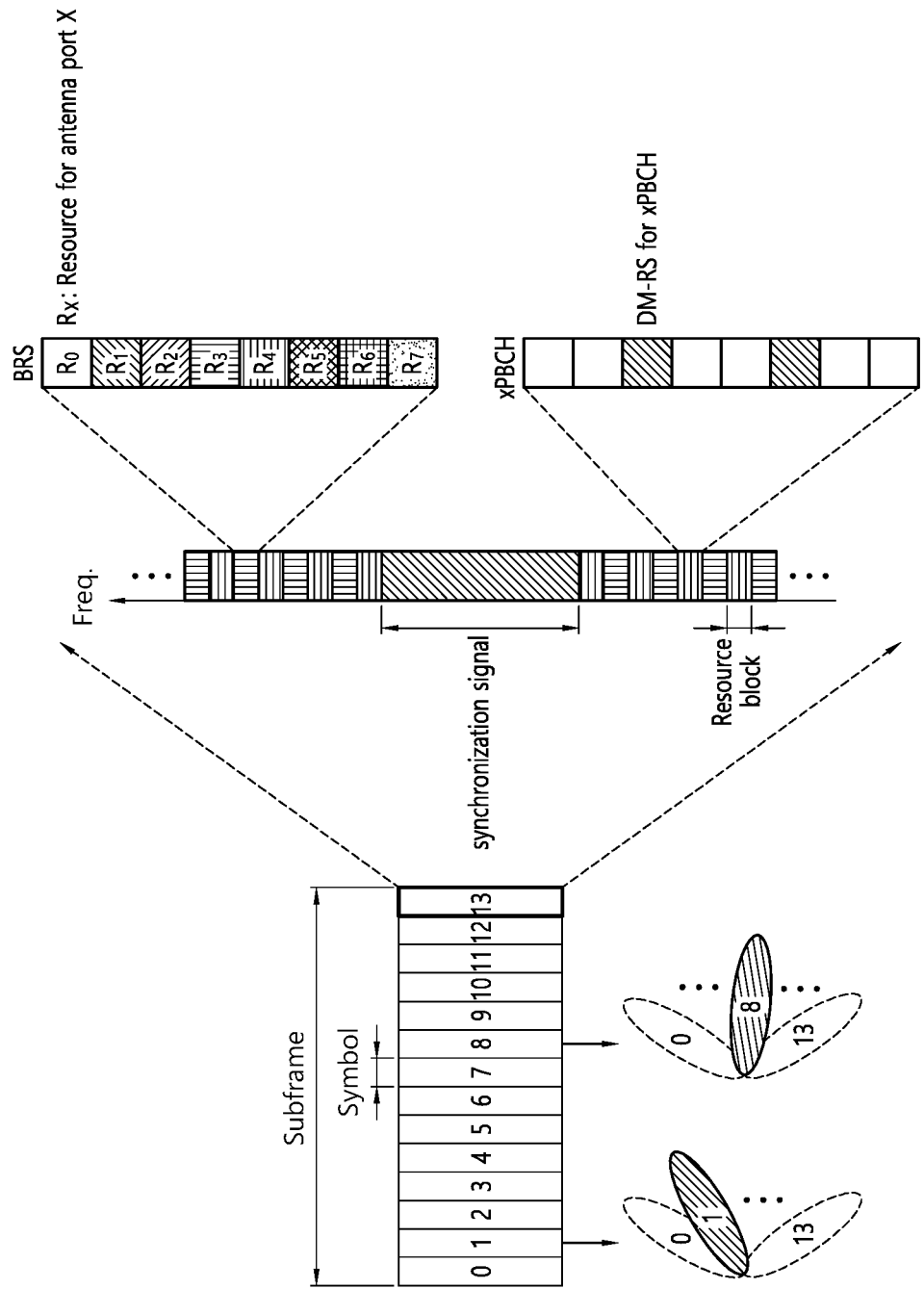
FIG. 11 illustrates the beam sweeping operation for a synchronization signal and system information in a downlink (DL) transmission procedure.

FIG. 11 illustrates the beam sweeping operation for a synchronization signal and system information in a downlink (DL) transmission procedure.

In FIG. 11, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 8, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

Hereinafter, the present description will be described.

In NR, a synchronization signal block (SSB) (or a synchronization signal and a physical broadcast channel (PBCH)) may consist of four OFDM symbols numbered in ascending order from 0 to 3 within the SSB in a time domain, and a PBCH related to a primary synchronization signal (PSS), a secondary synchronization signal (SSS), and a demodulation reference signal (DMRS) may be mapped to symbols. Herein, the SSB may also be expressed as an SS/PBCH block.

In the NR, each of the plurality of SSBs may be transmitted at a different timing, and the SSB may be used to perform initial access (IA), serving cell measurement, or the like. Therefore, the SSB is preferably transmitted when overlapping with another signal in terms of a transmitting timing and resource. To this end, a network may broadcast information on the transmitting timing and resource of the SSB, or may indicate it through UE-specific RRC signaling.

Meanwhile, in the NR, a CORESET configuration and a search space (SS) set configuration or the like may be defined for transmission and reception of a control channel, and a UE may be configured to monitor up to 3 CORESETS and 10 SS sets with respect to an active bandwidth part.

Each SS set configuration may include a CORESET identification (ID) associated with a corresponding SS set and information (e.g., a slot level monitoring periodicity, offset, a start symbol of CORESET, etc.) capable of deriving a monitoring occasion for the corresponding SS set. Herein, since the plurality of SS sets may have various configurations, assuming that there is no overlap between the SSB and the CORESET, scheduling flexibility of the network may be significantly damaged. Accordingly, when the CORESET overlaps with the SSB, there is no need to define an operation of the UE. For example, it is defined in the 3GPP RAN1 meeting that the UE performs the following operation when the CORESET overlaps with the SSB.

If a PDCCH decoding candidate having a CCE overlapped, even partially, with the configured SSB, the UE is not required to monitor the PDCCH with the decoding candidate.

The above definition means that blind decoding is not performed on a corresponding candidate when some or all resources of a candidate selected to perform blind decoding overlap with an SSB resource (configured in a UE) in a resource region defined by the CORESET configuration and the SS set configuration. Mil Meanwhile, it is defined in the NR that a wideband reference signal (RS) can be configured to increase coverage of a control channel and to improve decoding performance of the control channel. The wideband RS is expressed as precoder granularity in the specification, and a related agreement is as follows. Meanwhile, hereinafter, an RS type of the wideband RS may be a demodulation reference signal (DMRS).

For each CORESET, precoder granularity in frequency domain is:
Configurable between i) equal to the REG bundle size in the frequency domain; or ii) equal to the number of contiguous RBs in the frequency domain within the CORESET
For ii), DMRS is mapped over all REGs within CORESET.
RAN1 assumes that CORESET for PDCCH scheduling RMSI can be configured with Option i)
In Option ii) UE may assume DMRS is present in all REGs within the set of contiguous RBs of the CORESET where and when at least one REG of a candidate is mapped.

That is, when the UE performs blind decoding on a specific control channel candidate upon receiving signaling indicating that the precoder granularity is greater than the REG bundle size, a reference signal may be transmitted for each REG in contiguous RBs within the CORESET including a corresponding control channel candidate for the associated CORESET, and the same precoding can be assumed.

Figure 12:
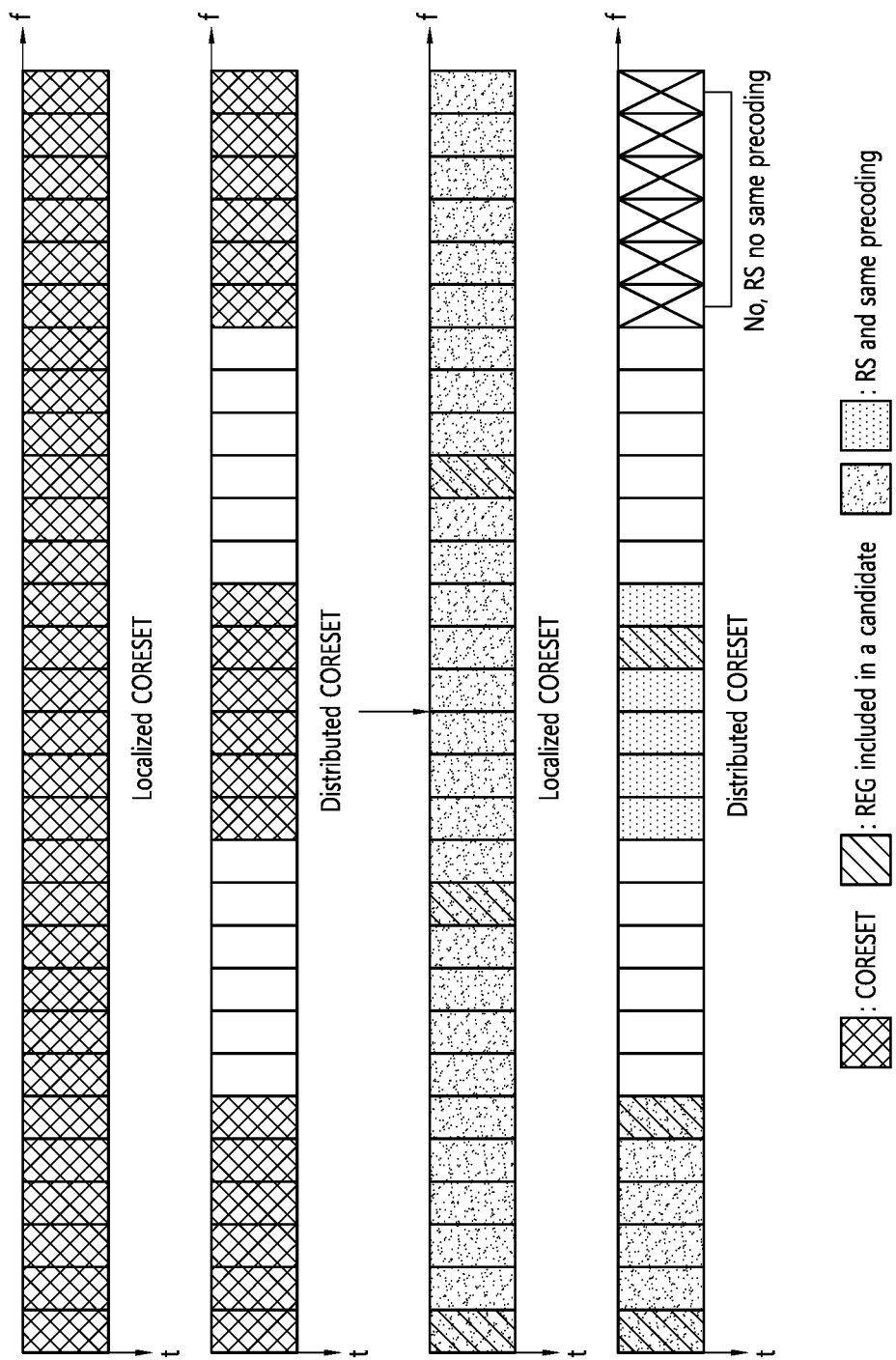
FIG. 12 shows an example for reference signal transmission and the same precoding assumption when a wideband reference signal is configured in a CORESET.

FIG. 12 shows an example for reference signal transmission and the same precoding assumption when a wideband reference signal is configured in a CORESET.

In FIG. 12, a localized CORESET means that RBs constituting the CORESET are disposed continuously, and a distributed CORESET means that one CORESET is disposed discontinuously in a frequency domain. Each CORESET part of the distributed CORESET is a set of different contiguous RBs constituting one CORESET. Each set of the different contiguous RBs may be called a sub-CORESET. Meanwhile, the localized CORESET or distributed CORE- SET described in the present description is arbitrarily named for convenience of explanation of the present description, and may be referred to as various names.

It is assumed in FIG. 12 that a UE performs monitoring on a candidate consisting of resources indicated by a hatched box. Herein, in the present specification including FIG. 12, the candidate may mean a PDCCH decoding candidate. In case of the localized CORESET in FIG. 12, since the entire CORESET consists of contiguous resource blocks, when blind decoding is performed in a corresponding CORESET, a reference signal is transmitted to all REGs belonging to the CORESET, and the same precoding can be assumed for the entire region of the CORESET.

On the other hand, in case of the distributed CORESET, a reference signal is transmitted only in contiguous resource blocks to which a candidate to be monitored belongs, and the same precoding can be assumed. In FIG. 12, if a set of contiguous resource blocks in the distributed CORESET includes a group 1, a group 2, and a group 3 along a frequency axis, the reference signal is transmitted only in the group 1 and group 2 including the candidate to be monitored, and the same precoding can be assumed for each group. On the other hand, in case of the group 3, since there is no candidate to be monitored, the reference signal is not transmitted in contiguous resource blocks corresponding to the group 3, and the same precoding cannot be assumed. Herein, each of the groups 1 to 3 may be the aforementioned sub-CORESET.

When the CORESET overlaps with the SSB as described above, whether blind decoding is performed on the candidate to be monitored has been defined. However, in a configuration of a wideband reference signal, there is no definition on the overlap of the CORESET and the SSB. Accordingly, it is necessary to define precoder granularity (or wideband reference signal) related to a case where the CORESET in which the wideband reference signal is configured overlaps with the SSB.

Figure 13:
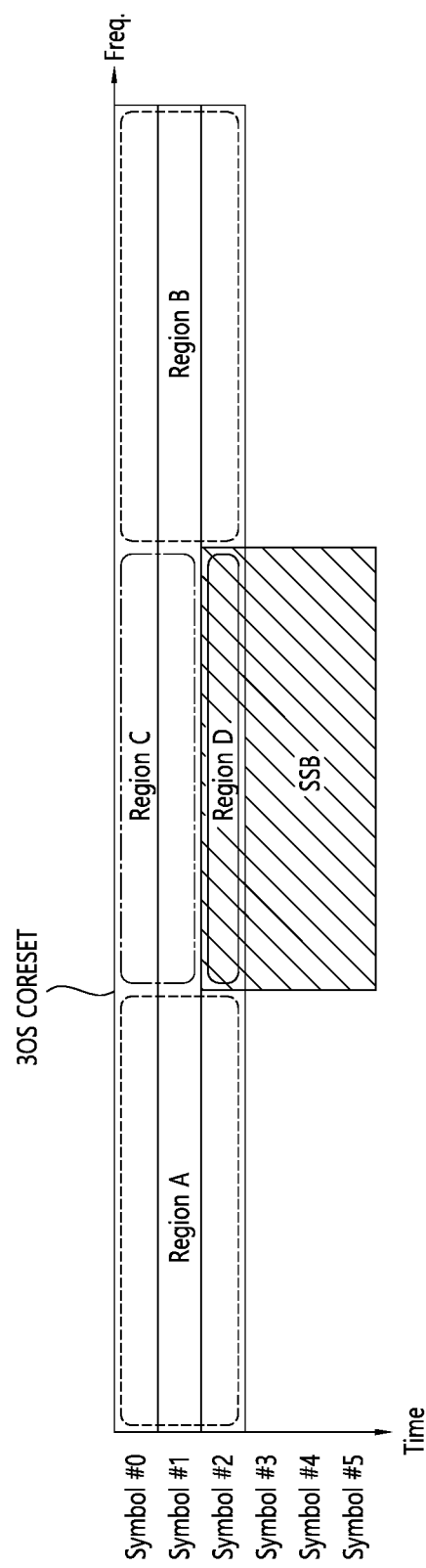
FIG. 13 shows an example for a case where a CORESET overlaps with an SSB.

FIG. 13 shows an example for a case where a CORESET overlaps with an SSB.

According to FIG. 13, the CORESET consists of 3 symbols in a time domain, and is defined in a region including an SSB transmission region in a frequency domain. When the entire CORESET is divided in terms of the overlap with the SSB, it may be divided into time/frequency resources (regions A and B in FIG. 13) not overlapping with the SSB, time/frequency resources (a region C in FIG. 13) not overlapping in the time domain but overlapping in the frequency domain, and time/frequency resources (a region D in FIG. 13) overlapping with the SSB.

When the CORESET overlaps with the SSB as shown in FIG. 13, if a network and a UE have different understandings of a reference signal configuration in an overlap region, channel estimation performance of the UE may be significantly damaged.

In order to prevent this, the present description proposes that the UE transmits a control reference signal and assumes the same precoding, when the CORESET overlaps with the SSB and a wideband reference signal is configured, by using one or a plurality of combinations of options described below. Meanwhile, although the wideband reference signal and the precoder granularity are used interchangeably, this may mean precoder granularity based on the aforementioned agreement. Additionally, among the options described below, a method to be actually applied may be pre-defined, or higher layer signaling or the like may be used so that a network uses a specific option according to a situation.

That is, when the UE receives a PDCCH, the UE may perform channel estimation by using a reference signal related to a corresponding PDCCH decoding candidate, and a channel estimation method of the wideband reference signal may more simplify a channel estimation operation of the UE by using interpolation or the like of a frequency band when performing channel estimation. Herein, there may be a case where the CORESET to which the wideband reference signal is mapped overlaps with the SSB. In this case, the method of receiving the reference signal for the channel estimation operation is problematic in regards to a corresponding overlapping CORESET part. Accordingly, the present description proposes a method of receiving a reference signal of a UE in regards to a corresponding overlapping CORESET part and a corresponding CORESET.

Figure 14:
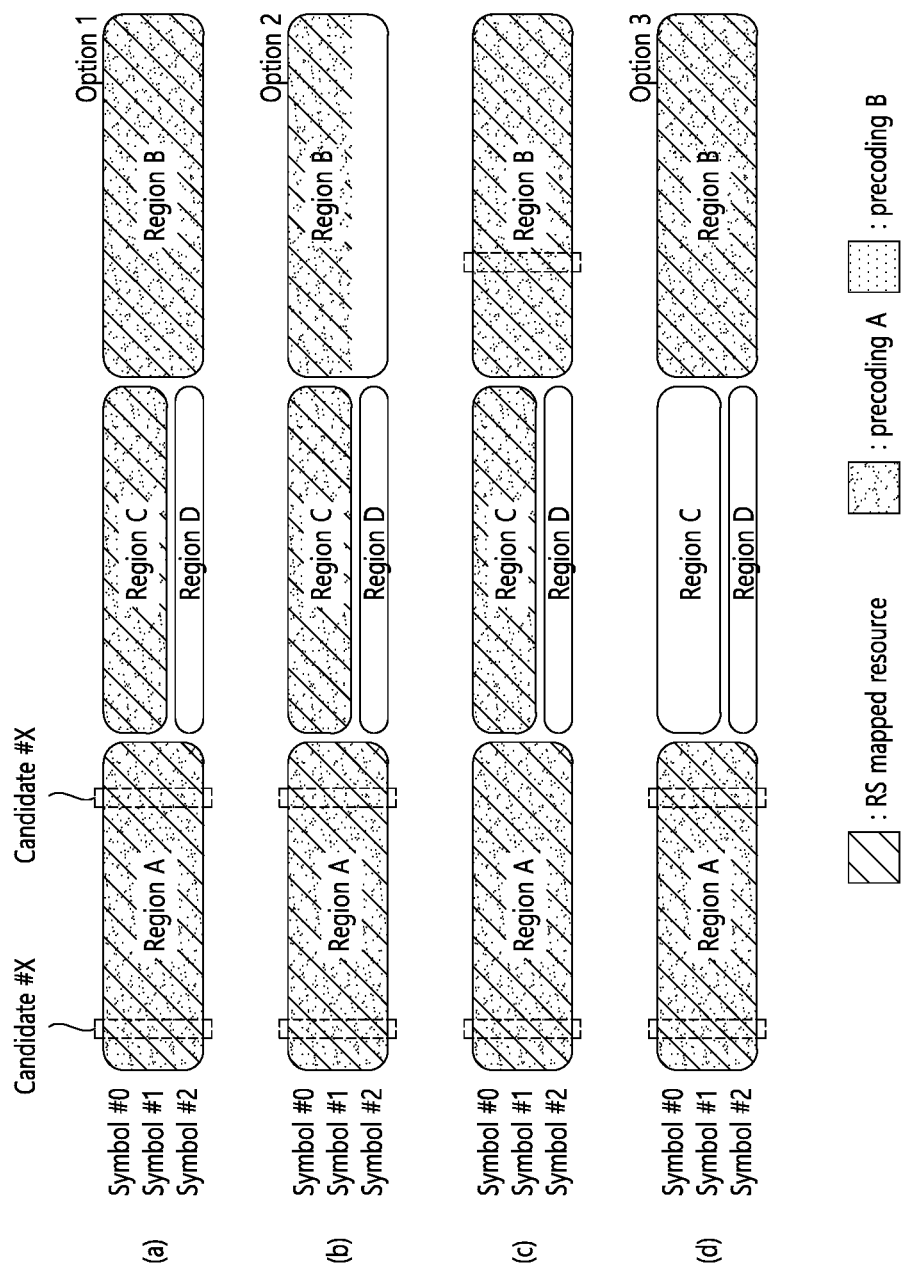
FIG. 14 shows an example for options based on reference signal mapping and the same precoding assumption proposed in the present description.
Figure 15:
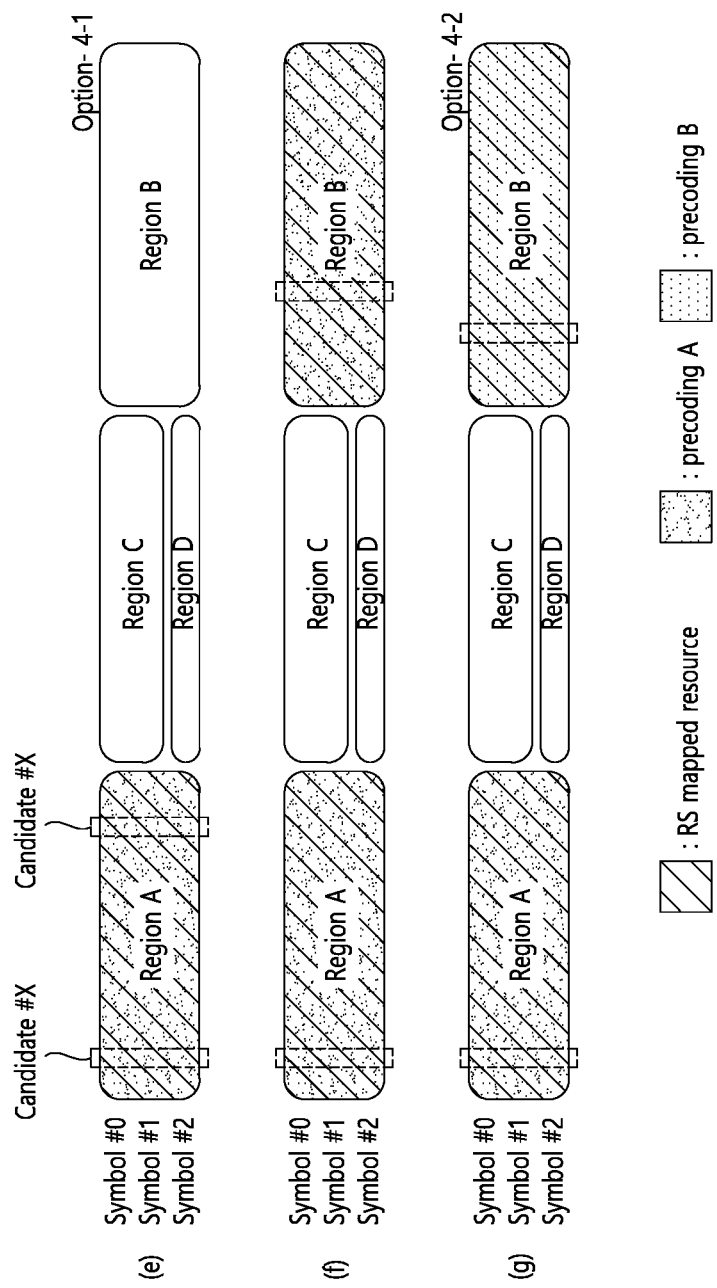
FIG. 15 shows an example for options based on reference signal mapping and the same precoding assumption proposed in the present description.

FIG. 14 and FIG. 15 show an example for options based on reference signal mapping and the same precoding assumption proposed in the present description. That is, the options described based on FIG. 14 and FIG. 15 may be used in a method of receiving a reference signal of a UE and channel estimation based thereon proposed in the present description.

Proposals of the present description will be described based on FIG. 14 and FIG. 15. In addition, only a region within the CORESET of FIG. 13 (i.e., the regions A, B, C, and D in FIG. 13) is shown in FIG. 14 and FIG. 15, and the region D indicates a region overlapping with the SSB. In addition, it is assumed in FIG. 14 and FIG. 15 that a wideband reference signal is configured in the CORESET.

Further, although the proposal is described based on a case where the CORESET overlaps with the SSB in the present description, the present description is not limited to the overlap with the SSB. For example, the present description may also be applied to a case where the CORESET overlaps with a reserved resource.

In addition, different options to be proposed may be applied according to a situation of applying the present description. For example, when the CORESET overlaps with the SSB, the option 2 (or option 4) may be applied, and when the CORESET overlaps with the reserved resource, the option 1 (or option 3) may be applied.

Additionally, one of the following options may be selected depending on a size of a region (of the SSB, the reserved resource, or the like) overlapping with the CORESET. For example, different options may be applied to a case where a size of a region overlapping with the CORESET and using a resource within the CORESET exceeds 10RB and a case where the size thereof is less than or equal to 10RB.

Hereinafter, options proposed in the present description will be described based on FIG. 14 and FIG. 15.

First, the option 1 and the option 2 indicate a method of transmitting a reference signal in a region not directly overlapping with an SSB among frequency-domain resources overlapping with the SSB in a situation where a wideband reference signal is mapped, and a method of assuming that a reference signal is not mapped in a region overlapping with the SSB. That is, unlike the options 3 and 4 described below, the option 1 and the option 2 relate to a method in which a reference signal is not mapped in a region D which is a region in which a CORESET directly overlaps with the SSB, whereas the reference signal is mapped in a region C which is a CORESET part not directly overlapping with the SB while having the same frequency band as the region D, and accordingly, the UE receives the reference signal. Herein, a reference signal mapping position in a symbol overlapping with the SSB may be configured differently depending on the options.

Specifically, the option 1 relates to a method in which a reference signal is not transmitted only in an overlap region. It may be assumed that the reference signal is not mapped in the overlap region while a UE operates in the same manner as in the existing wideband reference signal. That is, as shown in FIG. 14(a), the option 1 relates to a method in which the reference signal is mapped to the remaining CORESET excluding the region D in which the CORESET overlaps with the SSB, and the UE receives the reference signal based thereon.

In this case, the UE may perform channel estimation of a last symbol under the assumption that the reference signal is not transmitted in the region D, and may perform channel estimation also in time-domain channel estimation of the region C under the assumption that the reference signal is not transmitted in the region D. In this case, in precoding, the same precoding assumption used in a case where there is no region overlapping with the SSB may be directly applied. That is, irrespective of whether it overlaps with the SSB, whether the same precoding is applied may be determined by resource allocation (localized/distributed) for the CORESET and resource distribution of a candidate. The option 1 may have an advantage in that the existing method can be re-used as much as possible. Disadvantageously, however, it is difficult to expect improvement of channel estimation performance due to a reference signal to be mapped to the region B of a third symbol, and channel estimation complexity may increase.

Next, the option 2 relates to a method in which wideband reference signal mapping is performed for each symbol. This is a method which assumes that a reference signal is transmitted to contiguous REGs (in a frequency domain) in which a candidate to be monitored is transmitted. In this case, it may be assumed that, in a symbol overlapping with an SSB, contiguous REGs are separated by the SSB. That is, in a CORESET configuration, although it is a region consisting of contiguous REGs, a frequency-domain size of the region may be decreased by the SSB, or the REG may be divided into a plurality of contiguous REG groups.

In FIG. 14, in a first example (FIG. 14(b)) of the option 2, it can be known that a reference signal is not transmitted in the region B of a third symbol (a symbol #2 of FIG. 14) when the candidate to be monitored is mapped only to the region A, and in a second example (FIG. 14(c)) of the option 2, it can be known that the candidate is mapped to both the region A and the region B and thus the reference signal is also mapped to the third symbol of the region A and region B. In this case, in precoding, the same precoding assumption (of a case where there is no region overlapping with an SSB) may be directly applied for a region in which the reference signal is transmitted. That is, regarding the region in which the reference signal is transmitted, irrespective of whether it overlaps with the SSB, whether the same precoding is applied may be determined by resource allocation (localized/distributed) for a CORESET and resource distribution of a candidate. The option 2 can decrease channel estimation complexity compared to the option 1, but a structure for channel estimation may change for each symbol, which may result in an increase in complexity.

When the reference signal is transmitted in both the region A and the region B in the third symbol of the option 2, whether to perform channel estimation by using both of them may be determined by UE implementation. In this case, the UE may determine whether to use both the region A and the region B to perform channel estimation for a specific REG bundle according to a size of the region D in the frequency domain, or may determine whether to use only a reference signal of a corresponding region to perform channel estimation for an REG bundle belonging to each region. For example, when the region D is less than or equal to X RB in the frequency domain, channel estimation may be performed by using all reference signals of the region A and region B.

Next, the option 3 and the option 4 relate to a method in which a wideband reference signal is not mapped in a frequency domain overlapping with an SSB, and reference signal mapping for the remaining regions and the same precoding assumption may be configured differently depending on the options. In this case, reference signal distribution in a CORESET is configured uniformly (in the time/frequency domain) compared to the option 1 and the option 2, which may enable simpler UE implementation.

The option 3 (FIG. 14(d)) relates to a method in which the remaining regions excluding a frequency domain overlapping with an SSB are regarded as a localized CORESET. This may be useful when a size of a region which separates the CORESET is not great (e.g., less than or equal to 10RB) in the frequency domain. That is, one localized CORESET (or a contiguous region within the CORESET) has a discontinuous characteristic due to the SSB or a reserved resource or the like, and as shown in FIG. 14(d), irrespective of whether a candidate is included in discontinuous regions (regions A and B of FIG. 14) within the CORESET, a reference signal is mapped, and the same precoding can be assumed. In addition, according to the option 3, a method of receiving a reference signal based on the option 3 may be used when a distance between discontinuous regions is short and thus channel estimation performance can be improved.

For example, in FIG. 14 and FIG. 15, upon determining that the reference signal of the region B can improve channel estimation performance for a monitored candidate of the region A, whether to apply the option 3 may be determined through higher layer signaling or the like. Alternatively, it may be pre-defined to be applied when the distance between the discontinuous regions is less than or equal to a specific level (e.g., 10RB).

In the option 4, when a localized CORESET (or a contiguous region within a CORESET) is separated due to a specific situation (e.g., the overlap with an SSB, the overlap with a reserved resource) or the like, it may be regarded as a distributed CORESET (or a distributed region within the CORESET). This means that a corresponding frequency domain is not entirely used even if the CORESET is separated only in a specific symbol. For example, although a duration overlapping with the SSB is limited to the region D in the figure above, the region C which is the same frequency domain as the SSB is not used as the CORESET, which means that reference signal mapping in a corresponding region is not performed.

The option 4 may be divided into an option 4-1 in which the same precoding is assumed between distributed regions and an option 4-2 in which different precoding is assumed between the distributed regions. That is, the option 4 relates to proposed methods regarding whether the region A and the region B are determined as the same sub-CORESET to receive a reference signal responding thereto (i.e., the option 4-1) and whether the region A and the region B are determined as different sub-CORESETs to receive a reference signal corresponding thereto (i.e., the option 4-2), when the region A and the region B are physically separated due to the region D overlapping with the SSB within one CORESET and the region C having the same frequency band as the region D.

First, the option 4-1 (FIGS. 15(e) and (f)) will be described. Similarly to the option 3, one localized CORESET (or a contiguous region within the CORESET) is separated by a specific situation, and is preferably used when a frequency-domain distance between separated regions is short. It differs from the option 4-2 described below in that whether the same precoding can be assumed in different contiguous regions. FIG. 15(e) shows an example in which a reference signal is transmitted only in the region A since a candidate is present only in the region A, and the same precoding is assumed. FIG. 15(f) shows an example in which a reference signal is transmitted in the regions A and B since a candidate is present in each of the region A and the region B, and the same precoding is assumed.

The option 4-2 (FIG. 15(g)) relates to a method in which, when a localized CORESET (or a contiguous region within the CORESET) is separated, it is recognized as a distributed COREET and an operation for the distributed CORESET is performed. This may be applied only to a slot in which the localized CORESET is separated, and a wideband reference signal operation may be performed in the distributed CORESET. In other words, according to the option 4-2, a reference signal is transmitted in the regions A and B which are regions in which a candidate is present, and the same precoding is assumed for each of the region A and the region B, whereas the same precoding is not assumed between the region A and the region B. That is, in the option 4-2, different precoding is assumed between the region A and the region B, and a UE receives a reference signal based thereon.

Although not shown in FIG. 14 and FIG. 15, additionally, when the CORESET overlaps with an SSB or a reserved resource, only reference signal mapping may be performed in the overlap resources. This may be called an option 5. This may be limited to reference signal mapping. In PDCCH mapping, monitoring on a candidate including a resource belonging to a corresponding overlap region may be skipped, or rate matching or puncturing may be performed only on a resource belonging to the overlap region among resources included in a candidate. In this case, this may mean that a wideband reference signal is mapped based on a CORESET configuration irrespective of whether it overlaps with a different region (e.g., an SSB or a reserved resource). This may means that, when a network intends to transmit the SSB or a different signal in a corresponding region, rate matching or puncturing may be performed for a transmission position of a wideband reference signal in corresponding transmission/reception, and corresponding rate matching or puncturing information may be indicated to associated UEs through higher layer signaling or the like. In other words, when the wideband reference signal is configured in a specific CORESET and when the CORESET overlaps with an SSB included in an SSB list (notified by the network to the UE) in a specific slot, the UE may assume that the wideband reference signal is transmitted in the overlap region.

Likewise, although not shown in FIG. 14 and FIG. 15, as the simplest method, the UE may assume that the CORESET in which the wideband reference signal is configured does not overlap with the SSB, the reserved resource, or the like. This may be called an option 6.

The option 6 may be implemented using two methods. In a first method, when a CORESET in which a wideband reference signal is configured overlaps with an SSB, a reserved resource, or the like, it may be assumed that the wideband reference signal is transmitted irrespective of whether the SSB (or the reserved resources) is transmitted. That is, even if the CORESET in which the wideband reference signal is configured overlaps with the SSB or the like in practice, unlike in the aforementioned options, it is assumed that the wideband reference signal is always transmitted in an overlap region.

In another method, when a resource of an SSB (or reserved resources) configured in the UE overlaps with a CORESET (in which a wideband reference signal is configured) in a specific slot, monitoring on search space sets associated with the CORESET of the slot may be skipped. This does not mean to skip all monitoring occasions configured by the search space sets, and may be applied only for a slot in which an SSB notified by a network overlaps with a corresponding CORESET.

Additionally, the UE derives the number of candidates configured by a plurality of search space set configurations in each slot and complexity of channel estimation (the number of CCEs) to be performed due to corresponding candidates. When the derived value exceeds a pre-defined threshold, the UE may select specific candidates or may manage capability for blind decoding and channel estimation in a skipping manner.

In this case, as described above, when monitoring on the search space set or the CORESET is skipped (due to the overlap or the like with the CORESET and the SSB (or reserved resource)), preferably, the skipped candidates may not be included in the blind decoding count and/or CCE count derived in a corresponding slot. This may be understood as an action taken to prevent scheduling flexibility of the network from decreasing as much as possible due to the monitoring skip.

Alternatively, it may be predefined that a priority of a candidate belonging to a CORESET using a wideband reference signal and overlapping with an SSB is set to be the lowest in a candidate selection or skip process performed when the configured blind decoding and/or channel estimation exceed the capability. Herein, the lowest priority may mean that a selection probability or a skip probability is low. In addition, the lowest priority may be limitedly applied to a candidate directly overlapping with an SSB among some of candidates of a CORESET using a wideband reference signal and overlapping with the SSB.

Meanwhile, the aforementioned two methods are only examples for implementing the option 6, and the UE may receive a reference signal based on the option 6 by using various methods. For example, resource allocation may be performed such that a CORESET resource and an SSB resource do not overlap with each other due to a network configuration.

Figure 16:
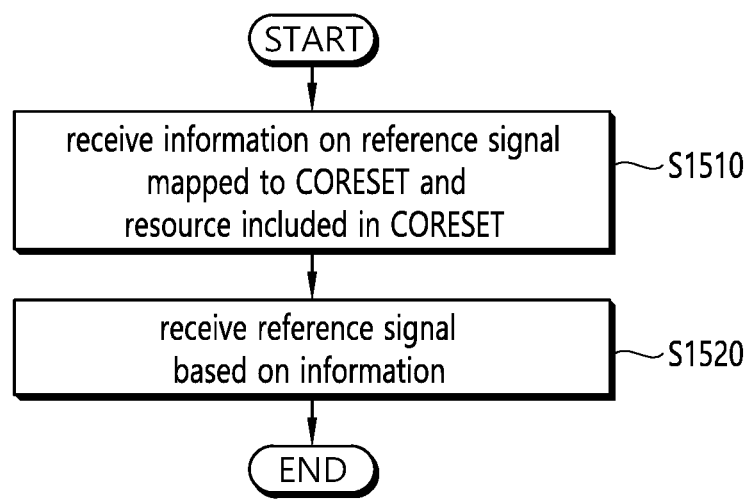
FIG. 16 is a flowchart for a method of receiving a reference signal of a UE, according to an embodiment of the present description.

FIG. 16 is a flowchart for a method of receiving a reference signal of a UE, according to an embodiment of the present description.

According to FIG. 16, the UE receives information on a reference signal mapped to a CORESET and a resource included in the CORESET (S1510). Herein, when the COREST overlaps with an SSB, the reference signal may be mapped to the CORESET excluding a part of the CORESET related to a frequency band of the overlapping CORESET. In addition, herein, the reference signal may be the aforementioned wideband reference signal or precoder granularity.

Thereafter, the UE receives the reference signal, based on the information (S1520).

Herein, the UE may receive the reference signal based on the aforementioned options 1 to 6, and may perform channel estimation based thereon. Since detailed examples thereof are the same as described above, detailed descriptions thereof will be omitted.

Figure 17:
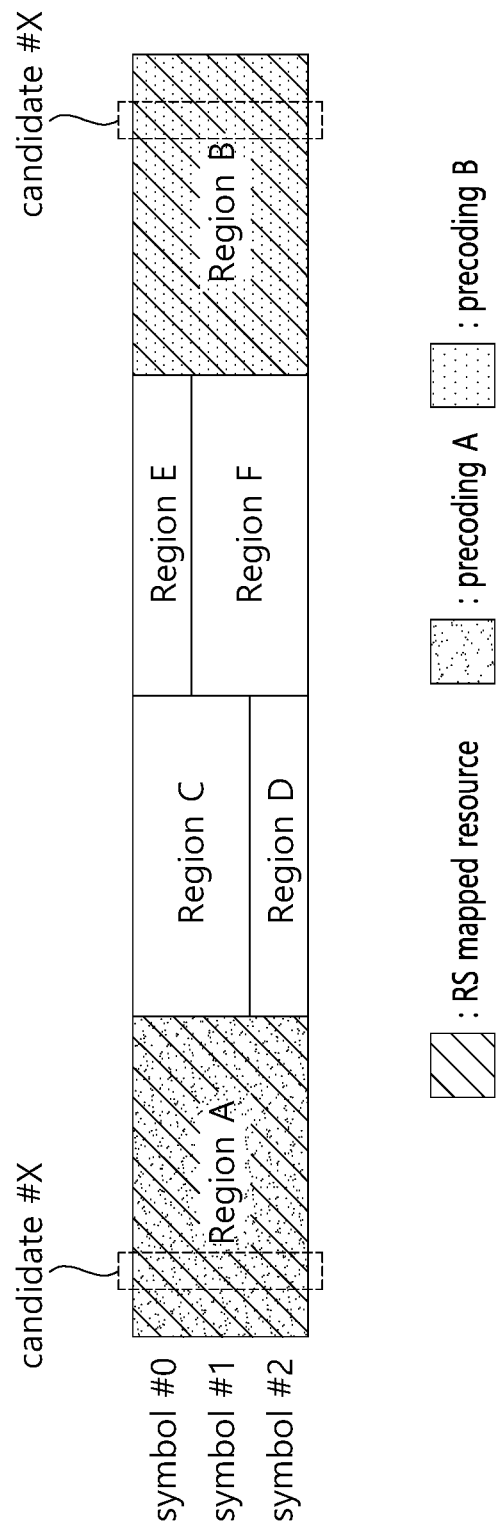
FIG. 17 briefly shows an example to which an embodiment of the present description is applied.

FIG. 17 briefly shows an example to which an embodiment of the present description is applied.

According to FIG. 17, one CORESET consists of a region A, a region B, a region C, a region D, a region E, and a region F. The region D is a region in which a CORESET overlaps with an SSB as shown in FIG. 14 and FIG. 15. The region F is a region in which a reserved resource overlaps with the COREST.

Herein, when the option 4-2 is applied for example, a reference signal is not mapped in the regions C and D corresponding to resources having the same frequency band as the region D in which the CORESET overlaps with the SSB. In addition, herein, the reference signal is not mapped to the regions E and F corresponding to resources having the same frequency band as the region F in which the CORESET overlaps with the reserved resource.

In this case, according to the option 4-2, since different precoding can be assumed in unit of contiguous resources within the CORESET, the region A in unit of contiguous resources may correspond to resources having precoding A, and the region B in unit of other contiguous resources may correspond to resources having precoding B.

Meanwhile, although only an example in which the option 4-2 is applied is shown in FIG. 17, it is possible to apply all options proposed in the present description. For example, as in the option 4-1, the regions A and B of FIG. 17 may correspond to resources having the same precoding. Alternatively, as in the option 2, a reference signal may be mapped to the regions A, B, C, and E of FIG. 17, and the regions A, B, C, and E of FIG. 17 may correspond to resource having the same precoding.

For a CORESET to which a wideband reference signal is mapped in a next-generation communication system, a method of receiving a reference signal of a UE is proposed in a situation where an SSB overlaps with the CORESET will be proposed through the aforementioned options. Accordingly, the UE can more efficiently perform a channel estimation operation.

Additionally, the present description proposes a PDSCH mapping scheme, when the CORESET in which the wideband reference signal is configured and the PDSCH are multiplexed in the same time-domain resource.

In the PDSCH of NR, a starting position of a time domain may be configured when a resource is allocated. In this case, the starting position may be configured within a region in which a control channel is transmitted. When the scheduled PDSCH overlaps with the COREST, a UE may perform rate matching of the PDSCH with respect to a PDCCH region in which the PDSCH is scheduled. However, when the wideband reference signal is used in the CORESET, in a control region, a reference signal may be transmitted outside a region in which a control channel is transmitted, and a PDSCH mapping scheme for a region in which the reference signal is transmitted shall be defined.

Accordingly, the present description proposes to select a PDSCH mapping scheme from among the following options when the CORESET in which the wideband reference signal is configured overlaps with the PDSCH.

Option 1) Rate matching for a wideband reference signal (WB RS) resource element (RE) associated with a PDCH of a corresponding UE The option 1 means that rate matching for a PDSCH is performed only for an RE in which a WB RS is transmitted from a perspective of each UE. In this case, when a PDCCH is transmitted for a plurality of UEs in a corresponding CORESET, the WB RS may be transmitted for PDCCH transmission of another UE in a PDSCH region of each UE, which may cause a deterioration of PDSCH performance. On the other hand, when only scheduling for one UE is performed in a corresponding CORESET, unnecessary rate matching may not be performed, thereby obtaining a gain in terms of a coding rate.

Option 2) Rate matching for all reference signal positions in a CORESET in which a WB RS is configured When the WB RS is configured for a specific CORESET in the current NR, a resource element used to transmit the WB RS in practice may be assumed for each UE. It may be assumed that a reference signal is transmitted in contiguous resource blocks including a corresponding candidate within the CORESET when each UE performs blind decoding for a PDCCH. That is, even if the WB RS is configured, an operation is performed by assuming that the reference signal is not transmitted in contiguous resource blocks not including REG, CCE, or the like of each decoding candidate. This means that, when a network configures a corresponding CORESET for a plurality of UEs, from a perspective of a specific UE, a PDCCH candidate of a corresponding UE is not included but a candidate of another UE is included, and thus a set of contiguous resource blocks for transmitting the WB RS may be present. Therefore, when a PDSCH for the specific UE overlaps with a CORESET in which the WB RS is configured, the WB RS for a PDCCH thereof is not present in a PDSCH resource from a perspective of a corresponding UE, but a WB RS for PDCCH transmission of another UE may be present in a PDSCH region of the corresponding UE. Accordingly, when the PDSCH overlaps with the CORESET in which the WB RS is configured, the option 2 proposes to perform PDSCH rate matching not only for contiguous resource blocks including DCI for scheduling the PDSCH but also for all reference signal transmission positions of the CORESET.

Option 3) Rate matching for a reference signal position of a corresponding CORESET, when a monitoring occasion of a WB RS CORESET is present in a specific slot and when a PDSCH scheduled in the slot overlaps with the WB RS CORESET.

The option 3 means that rate matching is performed by assuming that a reference signal is transmitted at a reference signal position in a WB RS CORESET, when a WB RS CORESET for performing monitoring overlaps with a scheduled PDSCH even if the PDSCH is not scheduled in the WB RS CORESET. The WB RS CORESET may be used to increase channel estimation performance for the increase of coverage, and a network preferably configures the CORESET for a plurality of UEs to increase efficiency. Therefore, even if the PDCCH is not transmitted in the WB RS CORESET to a specific UE, a probability that a reference signal is transmitted in the CORESET is high. When the PDSCH overlaps with the CORESET, rate matching is performed preferably for at least a reference signal resource element of the CORESET.

Figure 18:
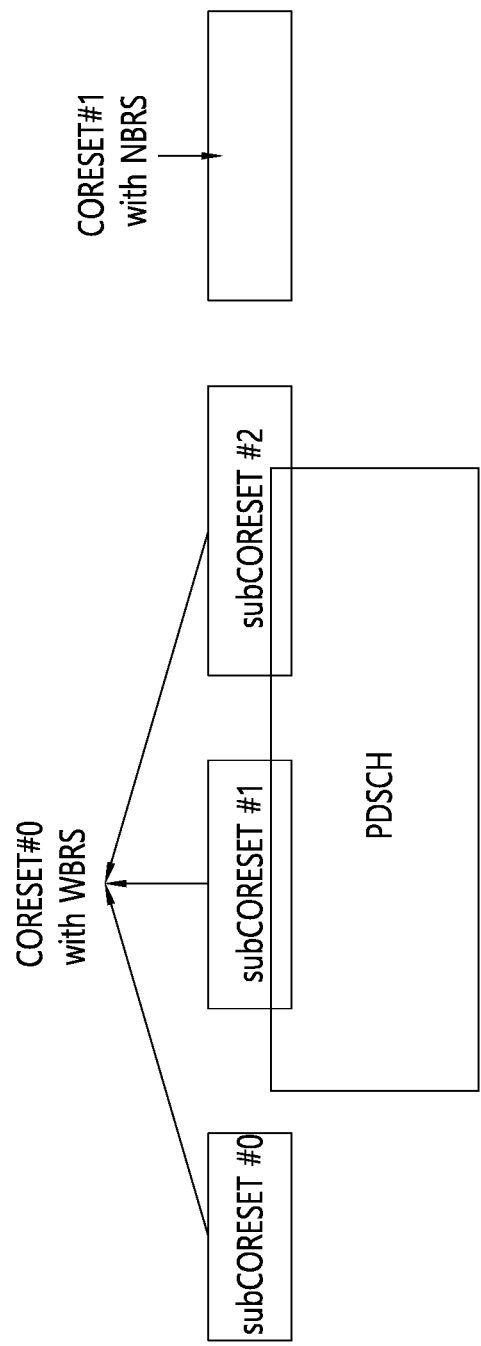
FIG. 18 is a schematic view of an embodiment of the present description.

FIG. 18 is a schematic view of an embodiment of the present description.

FIG. 18 shows a case of performing monitoring on a CORESET #0 in which a WB RS is configured and a CORESET #1 in which a narrowband reference signal (NB RS) is configured in a specific slot. It is assumed that a CORESET in which a WB RS is configured consists of three contiguous resource block sets (sub-CORESET #0, sub-CORESET #1, and sub-CORESET #2) in a frequency domain. Herein, the CORESET #0 may be the aforementioned distributed CORESET.

Assuming that DCI for scheduling a PDSCH is transmitted in the sub-CORESET #0 and sub-CORESET #1 of the CORESET #0 in FIG. 18, the option 1 of the present description means a method of performing PDSCH rate matching on a corresponding DCI transmission resource element of the sub-CORESET #1 and a reference signal resource element.

Under the same assumption, the option 2 may perform PDSCH rate matching on the reference signal resource element of sub-CORESET #1 and sub-CORESET #2 and the DCI transmission resource element of sub-CORESET #1. In this case, from a perspective of a corresponding UE, it may be assumed that a wideband reference signal is not transmitted in the sub-CORESET #2, and the option 2 means that reference signal transmission in the sub-CORESET #2, which may occur due to PDCCH transmission for another UE, is considered in PDSCH rate matching.

In case of the option 3, when the DCI is transmitted in the CORESET #0, the same operation as the option 2 may be performed, and when the DCI is transmitted in the CORESET #1, PDSCH rate matching may be additionally performed on a reference signal resource element of the sub-CORESET #1 and sub-CORESET #2.

Figure 19:
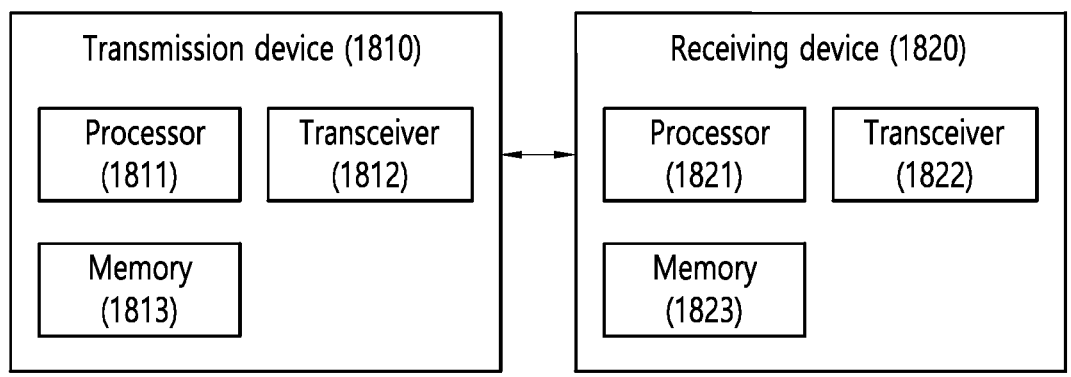
FIG. 19 is a block diagram showing a constitutional element of a transmitting device 1810 and receiving device 1820 for performing the present description.

FIG. 19 is a block diagram showing a constitutional element of a transmitting device 1810 and receiving device 1820 for performing the present description. Herein, the transmitting device and the receiving device may be respectively a BS and a UE.

The transmitting device 1810 and the receiving device 1820 may respectively include transceivers 1812 and 1822 capable of transmitting or receiving radio frequency (RF) signals carrying information, data, signals and messages, memories 1813 and 1823 for storing various types of information regarding communication in a wireless communication system, and processors 1811 and 1821 connected to components such as the transceivers 1812 and 1822 and the memories 1813 and 1823 and configured to control the memories 1813 and 1823 and/or the transceivers 1812 and 1822 such that the corresponding devices perform at least one of embodiments of the present description.

The memories 1813 and 1823 can store programs for processing and control of the processors 1811 and 1821 and temporarily store input/output information. The memories 1813 and 1823 may be used as buffers.

The processors 1811 and 1821 generally control overall operations of various modules in the transmitting device and the receiving device. Particularly, the processors 1811 and 1821 can execute various control functions for implementing the present description. The processors 1811 and 1821 may be referred to as controllers, microcontrollers, microprocessors, microcomputers, etc. The processors 1811 and 1821 can be realized by hardware, firmware, software or a combination thereof. When the present description is realized using hardware, the processors 1811 and 1821 may include ASICs (application specific integrated circuits), DSPs (digital signal processors), DSPDs (digital signal processing devices), PLDs (programmable logic devices), FPGAs (field programmable gate arrays) or the like configured to implement the present description. When the present description is realized using firmware or software, the firmware or software may be configured to include modules, procedures or functions for performing functions or operations of the present description, and the firmware or software configured to implement the present description may be included in the processors 1811 and 1821 or stored in the memories 1813 and 1823 and executed by the processors 1811 and 1821.

The processor 1811 of the transmitting device 1810 can perform predetermined coding and modulation on a signal and/or data to be transmitted to the outside and then transmit the signal and/or data to the transceiver 1812. For example, the processor 1811 can perform demultiplexing, channel coding, scrambling and modulation on a data string to be transmitted to generate a codeword. The codeword can include information equivalent to a transport block which is a data block provided by an MAC layer. One transport block (TB) can be coded into one codeword. Each codeword can be transmitted to the receiving device through one or more layers. The transceiver 1812 may include an oscillator for frequency up-conversion. The transceiver 1812 may include one or multiple transmission antennas.

The signal processing procedure of the receiving device 1820 may be reverse to the signal processing procedure of the transmitting device 1810. The transceiver 1822 of the receiving device 1820 can receive RF signals transmitted from the transmitting device 1810 under the control of the processor 1821. The transceiver 1822 may include one or multiple reception antennas. The transceiver 1822 can frequency-down-convert signals received through the reception antennas to restore baseband signals. The transceiver 1822 may include an oscillator for frequency down conversion. The processor 1821 can perform decoding and demodulation on RF signals received through the reception antennas to restore data that is intended to be transmitted by the transmitting device 1810.

The transceivers 1812 and 1822 may include one or multiple antennas. The antennas can transmit signals processed by the transceivers 1812 and 1822 to the outside or receive RF signals from the outside and deliver the RF signal to the transceivers 1812 and 1822 under the control of the processors 1811 and 1821 according to an embodiment of the present description. The antennas may be referred to as antenna ports. Each antenna may correspond to one physical antenna or may be configured by a combination of a plurality of physical antenna elements. A signal transmitted from each antenna cannot be decomposed by the receiving device 1820. A reference signal (RS) transmitted corresponding to an antenna defines an antenna from the viewpoint of the receiving device 1820 and can allow the receiving device 1820 to be able to estimate a channel with respect to the antenna irrespective of whether the channel is a single radio channel from a physical antenna or a composite channel from a plurality of physical antenna elements including the antenna. That is, an antenna can be defined such that a channel carrying a symbol on the antenna can be derived from the channel over which another symbol on the same antenna is transmitted. A transceiver which supports a multi-input multi-output (MIMO) function of transmitting and receiving data using a plurality of antennas may be connected to two or more antennas.

Figure 20:
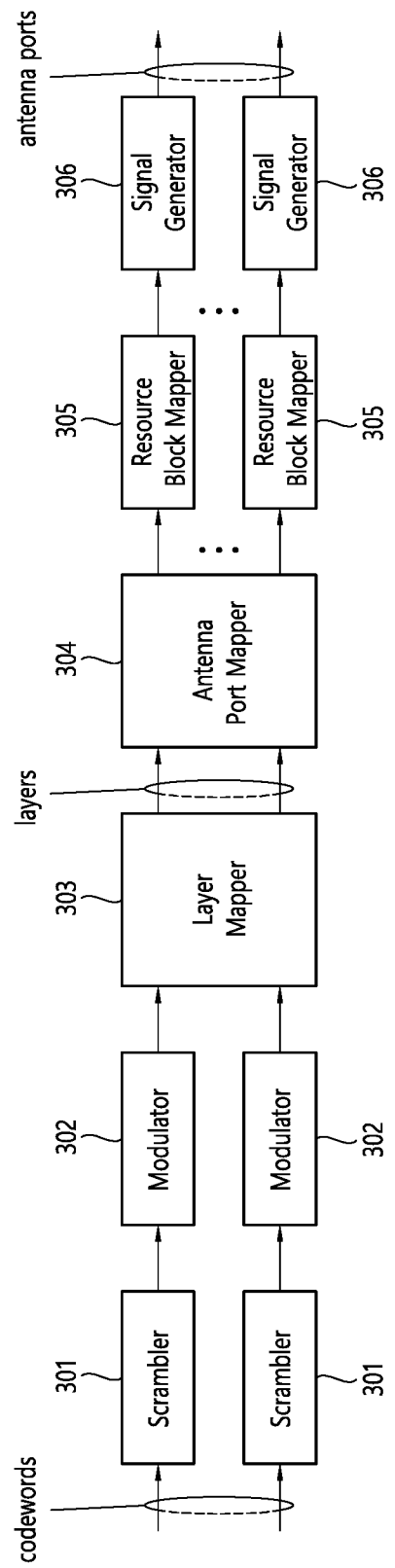
FIG. 20 illustrates an example of a signal processing module structure in the transmitting device 1810.

FIG. 20 illustrates an example of a signal processing module structure in the transmitting device 1810. Here, signal processing can be performed by a processor of a base station/terminal, such as the processors 1811 and 1821 of FIG. 19.

Referring to FIG. 20, the transmitting device 1810 included in a terminal or a base station may include scramblers 301, modulators 302, a layer mapper 303, an antenna port mapper 304, resource block mappers 305 and signal generators 306.

The transmitting device 1810 can transmit one or more codewords. Coded bits in each codeword are scrambled by the corresponding scrambler 301 and transmitted over a physical channel. A codeword may be referred to as a data string and may be equivalent to a transport block which is a data block provided by the MAC layer.

Scrambled bits are modulated into complex-valued modulation symbols by the corresponding modulator 302. The modulator 302 can modulate the scrambled bits according to a modulation scheme to arrange complex-valued modulation symbols representing positions on a signal constellation. The modulation scheme is not limited and m-PSK (m-Phase Shift Keying) or m-QAM (m-Quadrature Amplitude Modulation) may be used to modulate the coded data. The modulator may be referred to as a modulation mapper.

The complex-valued modulation symbols can be mapped to one or more transport layers by the layer mapper 303. Complex-valued modulation symbols on each layer can be mapped by the antenna port mapper 304 for transmission on an antenna port.

Each resource block mapper 305 can map complex-valued modulation symbols with respect to each antenna port to appropriate resource elements in a virtual resource block allocated for transmission. The resource block mapper can map the virtual resource block to a physical resource block according to an appropriate mapping scheme. The resource block mapper 305 can allocate complex-valued modulation symbols with respect to each antenna port to appropriate subcarriers and multiplex the complex-valued modulation symbols according to a user.

Each signal generator 306 can modulate complex-valued modulation symbols with respect to each antenna port, that is, antenna-specific symbols, according to a specific modulation scheme, for example, OFDM (Orthogonal Frequency Division Multiplexing), to generate a complex-valued time domain OFDM symbol signal. The signal generator can perform IFFT (Inverse Fast Fourier Transform) on the antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator may include an IFFT module, a CP inserting unit, a digital-to-analog converter (DAC) and a frequency upconverter.

Figure 21:
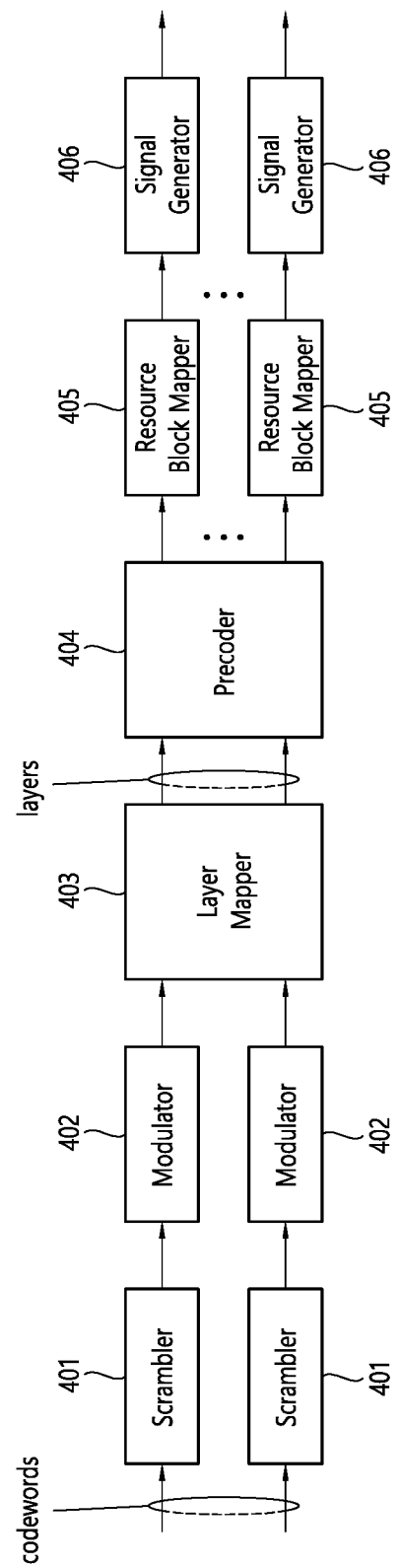
FIG. 21 illustrates another example of the signal processing module structure in the transmitting device 1810.

FIG. 21 illustrates another example of the signal processing module structure in the transmitting device 1810. Here, signal processing can be performed by a processor of a terminal/base station, such as the processors 1811 and 1821 of FIG. 19.

Referring to FIG. 21, the transmitting device 1810 included in a terminal or a base station may include scramblers 401, modulators 402, a layer mapper 403, a precoder 404, resource block mappers 405 and signal generators 406.

The transmitting device 1810 can scramble coded bits in a codeword by the corresponding scrambler 401 and then transmit the scrambled coded bits through a physical channel.

Scrambled bits are modulated into complex-valued modulation symbols by the corresponding modulator 402. The modulator can modulate the scrambled bits according to a predetermined modulation scheme to arrange complex-valued modulation symbols representing positions on a signal constellation. The modulation scheme is not limited and pi/2-BPSK (pi/2-Binary Phase Shift Keying), m-PSK (m-Phase Shift Keying) or m-QAM (m-Quadrature Amplitude Modulation) may be used to modulate the coded data.

The complex-valued modulation symbols can be mapped to one or more transport layers by the layer mapper 403.

Complex-valued modulation symbols on each layer can be precoded by the precoder 404 for transmission on an antenna port. Here, the precoder may perform transform precoding on the complex-valued modulation symbols and then perform precoding. Alternatively, the precoder may perform precoding without performing transform precoding. The precoder 404 can process the complex-valued modulation symbols according to MIMO using multiple transmission antennas to output antenna-specific symbols and distribute the antenna-specific symbols to the corresponding resource block mapper 405. An output z of the precoder 404 can be obtained by multiplying an output y of the layer mapper 403 by an N*M precoding matrix W. Here, N is the number of antenna ports and M is the number of layers.

Each resource block mapper 405 maps complex-valued modulation symbols with respect to each antenna port to appropriate resource elements in a virtual resource block allocated for transmission.

The resource block mapper 405 can allocate complex-valued modulation symbols to appropriate subcarriers and multiplex the complex-valued modulation symbols according to a user.

Each signal generator 406 can modulate complex-valued modulation symbols according to a specific modulation scheme, for example, OFDM, to generate a complex-valued time domain OFDM symbol signal. The signal generator 406 can perform IFFT (Inverse Fast Fourier Transform) on antenna-specific symbols, and a CP (cyclic Prefix) can be inserted into time domain symbols on which IFFT has been performed. OFDM symbols are subjected to digital-analog conversion and frequency up-conversion and then transmitted to the receiving device through each transmission antenna. The signal generator 406 may include an IFFT module, a CP inserting unit, a digital-to-analog converter (DAC) and a frequency upconverter.

The signal processing procedure of the receiving device 1820 may be reverse to the signal processing procedure of the transmitting device. Specifically, the processor 1821 of the transmitting device 1810 decodes and demodulates RF signals received through antenna ports of the transceiver 1822. The receiving device 1820 may include a plurality of reception antennas, and signals received through the reception antennas are restored to baseband signals, and then multiplexed and demodulated according to MIMO to be restored to a data string intended to be transmitted by the transmitting device 1810. The receiving device 1820 may include a signal restoration unit for restoring received signals to baseband signals, a multiplexer for combining and multiplexing received signals, and a channel demodulator for demodulating multiplexed signal strings into corresponding codewords. The signal restoration unit, the multiplexer and the channel demodulator may be configured as an integrated module or independent modules for executing functions thereof. More specifically, the signal restoration unit may include an analog-to-digital converter (ADC) for converting an analog signal into a digital signal, a CP removal unit for removing a CP from the digital signal, an FET module for applying FFT (fast Fourier transform) to the signal from which the CP has been removed to output frequency domain symbols, and a resource element demapper/equalizer for restoring the frequency domain symbols to antenna-specific symbols. The antenna-specific symbols are restored to transport layers by the multiplexer and the transport layers are restored by the channel demodulator to codewords intended to be transmitted by the transmitting device.

Figure 22:
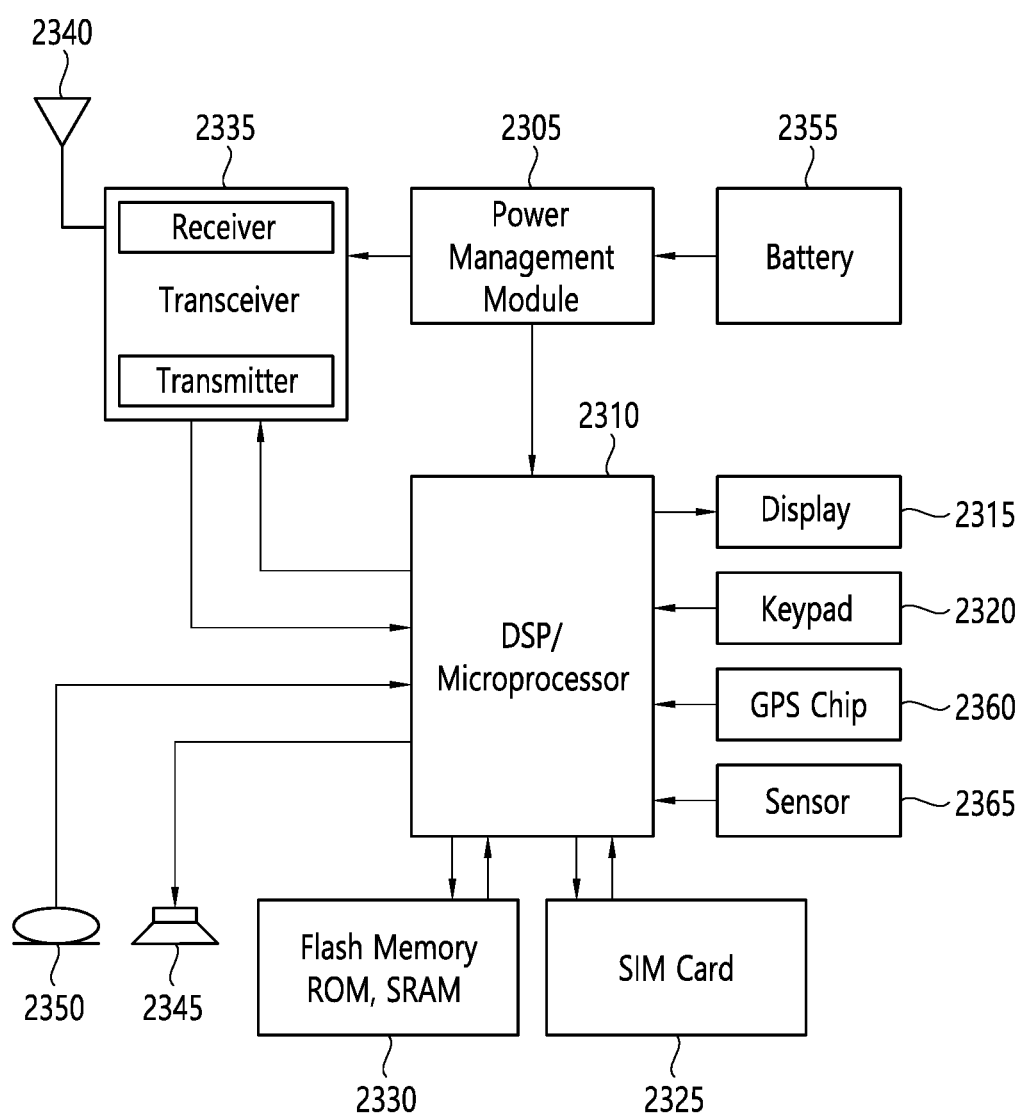
FIG. 22 illustrates an example of a wireless communication device according to an implementation example of the present description.

FIG. 22 illustrates an example of a wireless communication device according to an implementation example of the present description.

Referring to FIG. 22, the wireless communication device, for example, a terminal may include at least one of a processor 2310 such as a digital signal processor (DSP) or a microprocessor, a transceiver 2335, a power management module 2305, an antenna 2340, a battery 2355, a display 2315, a keypad 2320, a global positioning system (GPS) chip 2360, a sensor 2365, a memory 2330, a subscriber identification module (SIM) card 2325, a speaker 2345 and a microphone 2350. A plurality of antennas and a plurality of processors may be provided.

The processor 2310 can implement functions, procedures and methods described in the present description. The processor 2310 in FIG. 22 may be the processors 1811 and 1821 in FIG. 19.

The memory 2330 is connected to the processor 2310 and stores information related to operations of the processor. The memory may be located inside or outside the processor and connected to the processor through various techniques such as wired connection and wireless connection. The memory 2330 in FIG. 22 may be the memories 1813 and 1823 in FIG. 19.

A user can input various types of information such as telephone numbers using various techniques such as pressing buttons of the keypad 2320 or activating sound using the microphone 2350. The processor 2310 can receive and process user information and execute an appropriate function such as calling using an input telephone number. In some scenarios, data can be retrieved from the SIM card 2325 or the memory 2330 to execute appropriate functions. In some scenarios, the processor 2310 can display various types of information and data on the display 2315 for user convenience.

The transceiver 2335 is connected to the processor 2310 and transmit and/or receive RF signals. The processor can control the transceiver in order to start communication or to transmit RF signals including various types of information or data such as voice communication data. The transceiver includes a transmitter and a receiver for transmitting and receiving RF signals. The antenna 2340 can facilitate transmission and reception of RF signals. In some implementation examples, when the transceiver receives an RF signal, the transceiver can forward and convert the signal into a baseband frequency for processing performed by the processor. The signal can be processed through various techniques such as converting into audible or readable information to be output through the speaker 2345. The transceiver in FIG. 22 may be the transceivers 1812 and 1822 in FIG. 19.

Although not shown in FIG. 22, various components such as a camera and a universal serial bus (USB) port may be additionally included in the terminal. For example, the camera may be connected to the processor 2310.

FIG. 22 is an example of implementation with respect to the terminal and implementation examples of the present description are not limited thereto. The terminal need not essentially include all the components shown in FIG. 22. That is, some of the components, for example, the keypad 2320, the GPS chip 2360, the sensor 2365 and the SIM card 2325 may not be essential components. In this case, they may not be included in the terminal.

What is claimed is:

1. A method for receiving a reference signal of a user equipment (UE) in a wireless communication system, the method comprising:

receiving information on a control resource set (CORESET) and a reference signal to be mapped to a resource included in the CORESET; and receiving the reference signal, based on the information, wherein, based on the CORESET overlapping with a synchronization signal/physical broadcast channel block (SSB), the reference signal is mapped to a remaining resource region in the CORESET excluding an overlap resource region overlapping with the SSB, wherein the reference signal is not mapped to a specific resource region having a same time domain as the overlap resource region in the remaining resource region, and wherein the specific resource region is set in unit of contiguous resources in a frequency domain.

2. The method of claim 1, wherein the reference signal is mapped to a second resource region in the CORESET, excluding the overlap resource region and a first resource region having the same frequency band as the overlap resource region.

3. The method of claim 2, wherein the same precoding is applied in the second resource region.

4. The method of claim 2, wherein the reference signal is mapped only to a third resource region comprising a physical downlink control channel (PDCCH) decoding candidate in the second resource region.

5. The method of claim 4, wherein the third resource region has a same time domain as the CORESET, and is set in unit of contiguous resources in a frequency domain.

6. The method of claim 5, wherein a same precoding is applied in the third resource region.

7. The method of claim 5, wherein different precoding is applied in the third resource region in unit of contiguous resources in the frequency domain.

8. The method of claim 1, wherein a same precoding is applied in the remaining resource region.

9. The method of claim 1, wherein the reference signal is mapped to contiguous resources comprising a PDCCH decoding candidate in the specific resource region.

10. The method of claim 9, wherein the same precoding is applied to resources to which the reference signal is mapped.

11. The method of claim 1, wherein the UE receives the information, based on higher layer signaling.

12. The method of claim 1, wherein the reference signal is a demodulation reference signal (DMRS).

13. The method of claim 1, wherein, based on the CORESET overlapping with a reserved resource, the reference signal is not mapped to a resource overlapping with the reserved resource in the CORESET.

14. A user equipment (UE) comprising:

a transceiver transmitting and receiving a radio signal; and a processor operatively coupled with the transceiver, wherein the processor is set to:

receive information on a control resource set (CORESET) and a reference signal to be mapped to a resource included in the CORESET; and receive the reference signal, based on the information, wherein, based on the CORESET overlapping with a synchronization signal/physical broadcast channel block (SSB), the reference signal is mapped to a remaining resource region in the CORESET excluding an overlap resource region overlapping with the SSB, wherein the reference signal is not mapped to a specific resource region having a same time domain as the overlap resource region in the remaining resource region, and wherein the specific resource region is set in unit of contiguous resources in a frequency domain.

* * * * *